US012754456B2

(12) United States Patent
Okahisa

(10) Patent No.: US 12,754,456 B2
(45) Date of Patent: *Oct. 6, 2026

(54) LIGHT EMITTING MODULE

(71) Applicant: NICHIA CORPORATION, Anan (JP)

(72) Inventor: Tsuyoshi Okahisa, Tokushima (JP)

(73) Assignee: NICHIA CORPORATION, Anan (JP)

( * ) Notice: Subject to any disclaimer, the term of this patent is extended or adjusted under 35 U.S.C. 154(b) by 0 days.

This patent is subject to a terminal disclaimer.

(21) Appl. No.: 19/001,662

(22) Filed: Dec. 26, 2024

(65) Prior Publication Data

US 2025/0123538 A1 Apr. 17, 2025

Related U.S. Application Data

(63) Continuation of application No. 18/464,763, filed on Sep. 11, 2023, now Pat. No. 12,216,383.

(30) Foreign Application Priority Data

Sep. 29, 2022 (JP) ................................ 2022-156583
Oct. 14, 2022 (JP) ................................ 2022-165428
(Continued)

(51) Int. Cl.
*G03B 15/03* (2021.01)
*F21V 3/06* (2018.01)
*F21V 5/04* (2006.01)

(52) U.S. Cl.
CPC ............ *G03B 15/03* (2013.01); *F21V 3/0625* (2018.02); *F21V 5/045* (2013.01)

(58) Field of Classification Search
CPC ........ G03B 15/03; F21V 3/0625; F24V 5/045
See application file for complete search history.

(56) References Cited

U.S. PATENT DOCUMENTS

2006/0187652 A1* 8/2006 Doyle ..................... F21V 23/02 362/101
2008/0170409 A1 7/2008 Tendo et al.
(Continued)

FOREIGN PATENT DOCUMENTS

JP H04-118516 U 10/1992
JP 2012-064367 A 3/2012
(Continued)

OTHER PUBLICATIONS

Final Office Action in U.S. Appl. No. 18/464,763 dated Aug. 16, 2024.

(Continued)

*Primary Examiner* — Christopher E Dunay
(74) *Attorney, Agent, or Firm* — Foley & Lardner LLP

(57) ABSTRACT

A light emitting module includes: a light source including a plurality of light emitting parts that are configured to be turned on individually or configured to be turned on in groups of multiple light emitting parts; and a cover member disposed over the light source and configured to transmit light from the light source, the cover having an upper surface that includes a flat surface portion. The cover member includes, in a top view: a first region, a second region located around the first region, wherein a light diffusion effect of the second region is higher than a light diffusion effect of the first region, and a third region located inward of the first region and on which the light from the light source transmitted through the light from the light source is incident.

17 Claims, 21 Drawing Sheets

(30) Foreign Application Priority Data

| | | |
|---|---|---|
| Nov. 15, 2022 | (JP) | 2022-182724 |
| Jun. 12, 2023 | (JP) | 2023-096437 |

(56) References Cited

U.S. PATENT DOCUMENTS

| | | | | |
|---|---|---|---|---|
| 2011/0121709 | A1* | 5/2011 | Rong | H01J 61/827 313/111 |
| 2013/0343035 | A1* | 12/2013 | Sakai | F21V 5/02 362/311.15 |
| 2015/0247621 | A1* | 9/2015 | Nakamura | F21K 9/60 362/327 |
| 2019/0369370 | A1 | 12/2019 | Yamamoto | |
| 2020/0073207 | A1* | 3/2020 | Okahisa | G02B 3/0056 |
| 2023/0100351 | A1* | 3/2023 | Mizukami | F21V 5/04 362/297 |

FOREIGN PATENT DOCUMENTS

| | | | |
|---|---|---|---|
| JP | 2013-127941 | A | 6/2013 |
| JP | 2016-058284 | A | 4/2016 |
| JP | 2018-120113 | A | 8/2018 |
| JP | 2019-087427 | A | 6/2019 |
| WO | WO-2015/125557 | A1 | 8/2015 |

OTHER PUBLICATIONS

Non-Final Office Action in U.S. Appl. No. 18/464,763 dated May 16, 2024.

* cited by examiner

LIGHT EMITTING MODULE

CROSS-REFERENCE TO RELATED APPLICATIONS

The present application is a continuation of U.S. patent application Ser. No. 18/464,763, filed on Sep. 11, 2023, which is based on and claims priority to Japanese Patent Application No. 2022-156583, filed on Sep. 29, 2022, Japanese Patent Application No. 2022-165428, filed on Oct. 14, 2022, Japanese Patent Application No. 2022-182724, filed on Nov. 15, 2022, and Japanese Patent Application No. 2023-096437, filed on Jun. 12, 2023. The entire contents of these Japanese patent applications are hereby incorporated by reference.

BACKGROUND

The present disclosure relates to a light emitting module.

Light emitting modules having semiconductor elements such as LEDs (Light Emitting Diodes) have been widely used. As such a light emitting module, for example, PCT Publication No. 2015-125557 discloses a configuration including a light source unit, a lens, and a cover member, in which diffusion portions consisting of parallel grooves are formed in a part of the cover member.

SUMMARY

In the light emitting module, it is required to reduce stray light on the irradiation surface.

It is an object of certain embodiments of the present disclosure to provide a light emitting module that reduces stray light on an irradiation surface.

A light emitting module according to an embodiment of the present disclosure includes a light source, a lens disposed over the light source and configured to transmit light from the light source, and a cover member disposed over the lens, wherein the cover member includes, in a top view, a first region, a second region located around the first region and having a higher light diffusion effect than the first region, and a third region located inward of the first region and on which the light from the light source transmitted through the lens is incident.

According to an embodiment of the present disclosure, it is possible to provide a light emitting module that reduces stray light on an irradiation surface.

DETAILED DESCRIPTION

Figure 1:
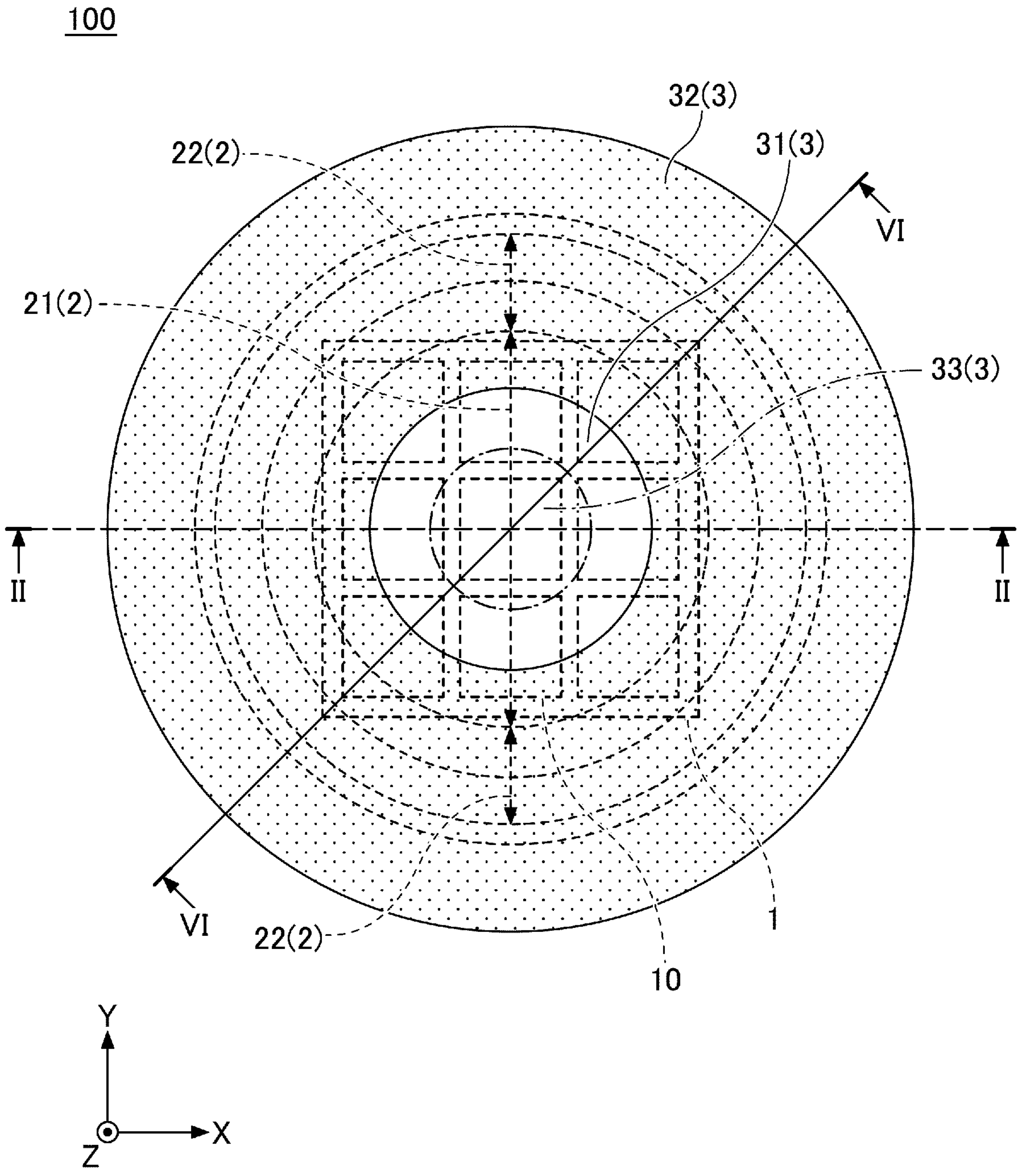
FIG. 1 is a schematic top view illustrating an example of a light emitting module according to an embodiment.

A light emitting module according embodiments of the present disclosure will be described in detail with reference to the accompanying drawings. The embodiments described below are only examples of a light emitting module for embodying the technical concepts of the present invention. The present invention is not limited to the described embodiments. Further, dimensions, materials, shapes, relative arrangements, and the like of components described in the embodiments are not intended to limit the scope of the present invention, and are merely illustrative examples unless otherwise specified. Note that the sizes, positional relationships, and the like of members illustrated in the drawings may be exaggerated for clearer illustration. In the following description, the same names and reference numerals denote the same or similar members, and a detailed description thereof will be omitted as appropriate. As a cross-sectional view, an end view illustrating only a cut surface may be used.

Although directions may be indicated by an X-axis, a Y-axis, and a Z-axis in the drawings described below, the X-axis, the Y-axis, and the Z-axis are directions orthogonal to each other. An X direction along the X-axis and a Y direction along the Y-axis indicate directions along a light emitting surface of a light emitting part included in a light emitting module according to the embodiment. A Z direction along the Z-axis indicates a direction orthogonal to the light emitting surface. That is, the light emitting surface of the light emitting part is parallel to the XY plane, and the Z-axis is orthogonal to the XY plane.

A direction indicated by an arrow in the X direction is referred to as a +X direction or a +X side, and a direction opposite to the +X direction is referred to as a −X direction or a −X side. A direction indicated by an arrow in the Y direction is referred to as a +Y direction or a +Y side, and a direction opposite to the +Y direction is referred to as a −Y direction or a −Y side. A direction indicated by an arrow in the A direction is referred to as a +Z direction or a +Z side, and a direction opposite to the +Z direction is referred to as a −Z direction or a −Z side. In the embodiment, it is assumed that the light emitting part included in the light emitting module emits light to the +Z side as an example. Further, the term "top view" as used in the embodiment described below refers to viewing an object downward from a position located further in the +Z direction. However, these directions do not limit the orientation of the light emitting module during use, and the orientation of the light emitting module is arbitrary. In addition, in the present embodiment, a surface of the object when viewed from the +Z direction or the +Z side is referred to as an "upper surface", and a surface of the object when viewed from the −Z direction or the −Z side is referred to as a "lower surface". In the embodiment described below, each of "along the X-axis", "along the Y-axis", and "along the Z-axis" includes a case where the object is at an inclination within a range of ±10° with respect to the corresponding one of the axes. Further, in the present embodiment, an orthogonal configuration may include an error within ±10° with respect to 90°.

Overall Configuration Example of Light Emitting Module

Figure 2A:
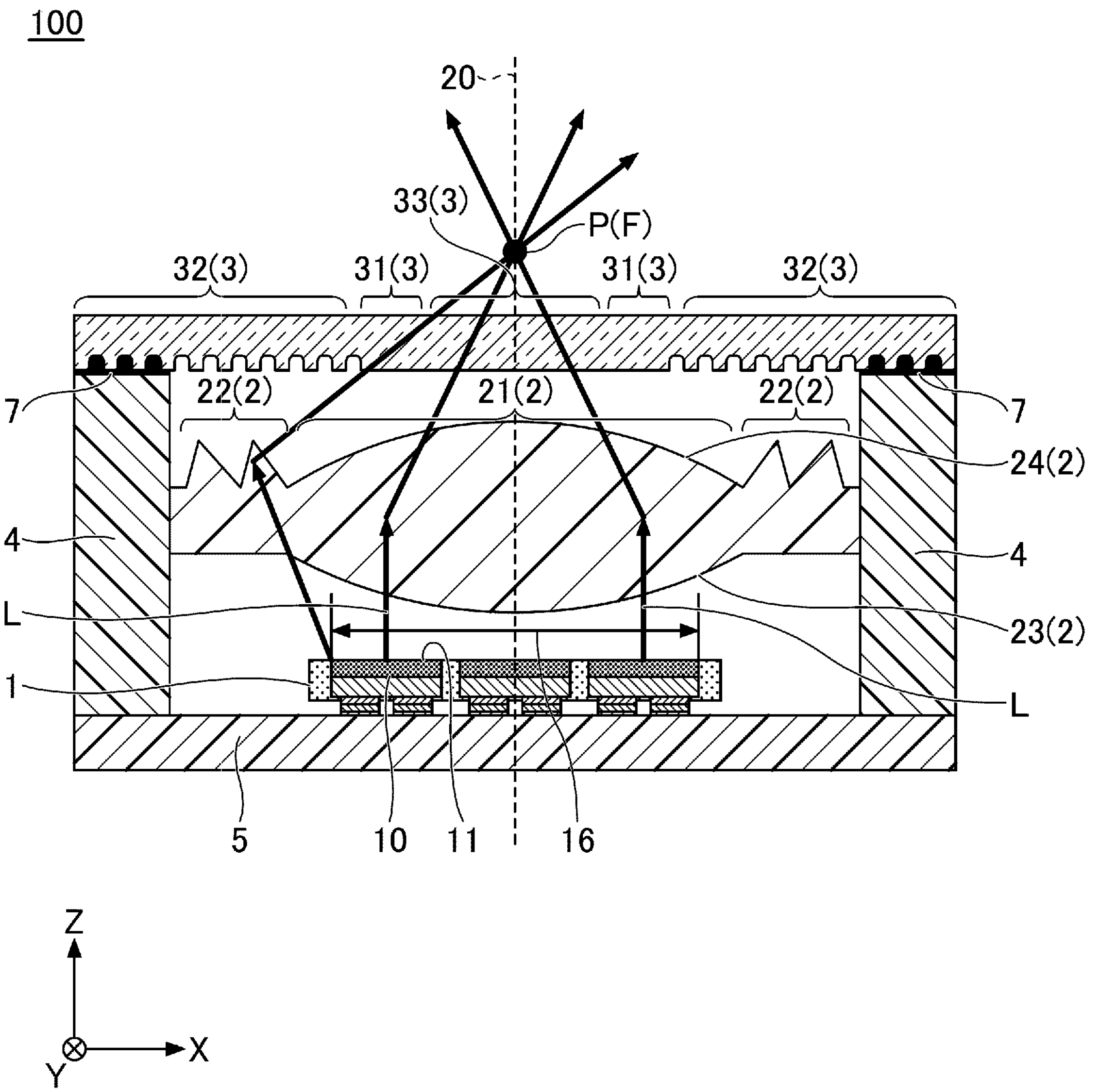
FIG. 2A is a schematic cross-sectional view taken along line II-II in FIG. 1.

The overall configuration of the light emitting module according to the embodiment will be described with reference to FIG. 1 and FIG. 2A. FIG. 1 is a schematic top view illustrating an example of a light emitting module 100 according to the embodiment. FIG. 2A is a schematic cross-sectional view taken along line II-II in FIG. 1. As an example, the light emitting module 100 is mounted on a smartphone and is a light emitting flash module for an imaging device provided in the smartphone. Examples of the imaging device include a camera for capturing a still image and a video camera for capturing a moving image.

In the present embodiment, the light emitting module 100 includes a light source 1, a lens 2, and a cover member 3. As illustrated in FIG. 1, the light emitting module 100 has a substantially circular outer shape in a top view. However, the light emitting module 100 may have an outer shape such as a substantially rectangular shape, a substantially elliptical shape, or a substantially polygonal shape in a top view.

The light source 1 is mounted on the upper surface (a surface on the +Z side) of a first mounting substrate 5. The light source 1 includes a light emitting region 16 including at least one light emitting surface. In the example illustrated in FIG. 1 and FIG. 2A, the light source 1 includes nine light emitting parts 10 each having a light emitting surface 11. The region including the plurality of the light emitting surfaces 11 is an example of the light emitting region 16. When there is only one light emitting surface 11, the light emitting region 16 is a region surrounded by the outer edge of the light emitting surface 11. When the light source 1 includes a plurality of the light emitting surfaces 11, the light emitting region 16 is a region formed by connecting the outer edges of the light emitting surfaces 11 located on the outer side in a top view. The light source 1 emits light L in the direction toward the lens 2 from the light emitting surface 11 included in each of the plurality of the light emitting parts 10. The number of the light emitting parts 10 included in the light source 1 is not limited to nine, and the light source 1 may include at least one light emitting part 10.

The plurality of the light emitting parts 10 may be individually turned on or may be turned on by groups. By individually turning on the plurality of the light emitting parts 10 with desired brightness or turning on the light emitting parts 10 by groups, it is possible to improve contrast on an irradiation surface irradiated with light from the light source 1. The light emitting module 100 can perform partial irradiation on the irradiation surface by individually turning on the plurality of the light emitting parts 10 or turning on the light emitting parts 10 by groups. The term "partial irradiation" in the present specification refers to that a partial region of the irradiation surface is irradiated with light.

In the partial irradiation, a partial region of an irradiation surface is irradiated with light. Therefore, it is preferable that an outer edge of the irradiation light be clear to make the light with which desired region is irradiated conspicuous. That is, it is preferable to have a large difference in illuminance of the irradiation light between in a desired region to be irradiated with light and a region other than the desired region. In other words, it is preferable that the amount of around the stray light irradiation light is small in a desired region of the irradiation surface to be irradiated with light.

When the light emitting module 100 according to the present embodiment is used as a flash light source of an imaging device, light can be emitted by switching between a wide-angle mode in which all the light emitting parts 10 emit light and a narrow-angle mode in which only the light emitting parts 10 located near the center of the light emitting region 16 emit light and the light emitting parts 10 located near the outer edge of the light emitting region 16 do not emit light. In the narrow-angle mode, an irradiation angle of the light is narrower than that in the wide-angle mode. With the light emitting module 100 configured to switch the irradiation light in accordance with the wide-angle mode and the narrow-angle mode, it is possible to perform photographing in accordance with a photographing mode such as close-up photography or telephoto photography of the imaging device.

In the present embodiment, light from each of the plurality of the light emitting parts 10 and having passed through the lens 2 irradiates a region located opposite to the position of the respective one of the plurality of the light emitting parts 10 with respect to a point P on an optical axis 20 of the lens 2. This allows for easily ascertaining the relationship between each of the plurality of the light emitting parts 10 and an irradiation position, to which light from the respective one of the plurality of the light emitting parts 10 is irradiated, on the irradiation surface, which is a surface to be irradiated with the light L from the light emitting module 100, and thus facilitating control of light. Accordingly, the light emitting module 100 can partially irradiate the irradiation surface with light. Further, most of the light L of the light emitting part 10 is transmitted through a first convex surface 23 and a second convex surface 24 of the lens 2, so that it is possible to irradiate a desired region with the light from the light source 1. The configuration of the light source 1 will be separately described in detail with reference to FIG. 3 and FIG. 4.

The first mounting substrate 5 is a plate-like member having a substantially circular outer shape in a top view. However, the first mounting substrate 5 may have an outer shape such a substantially as rectangular shape, a substantially elliptical shape, or a substantially polygonal shape in a top view. The first mounting substrate 5 is a substrate including wiring on which the light source 1 and various electric elements can be mounted.

The lens 2 is an optical element that is disposed over the light source 1 and transmits the light L from the light source 1. The lens 2 includes an effective portion 21 and a lens portion 22. The effective portion 21 is composed of the first convex surface 23 and the second convex surface 24. The first convex surface 23 protrudes in the direction (−Z side) in which the light source 1 is located. The second convex surface 24 protrudes in the direction (+Z side) opposite to the direction in which the light source 1 is located. The lens portion 22 is a ring-shaped portion provided outside the effective portion 21 in a top view.

In the present embodiment, the lens portion 22 includes a light exit surface having a Fresnel shape. In the example illustrated in FIG. 2A, the light exit surface is a surface of the lens 2 on the +Z side. The Fresnel shape of the lens portion 22 reflects light (stray light) traveling to the outside of the light emitting module 100 particularly from the light emitting part 10 on the outer side in a top view, so that the light can be used as irradiation light. The Fresnel shape of the lens portion 22 compensates for the light condensing performance of the lens 2 that decreases with distance from the optical axis 20 in the direction orthogonal to the optical axis 20. In the light emitting module 100, the lens portion 22 having a Fresnel shape allows for reducing stray light.

Figure 2B:
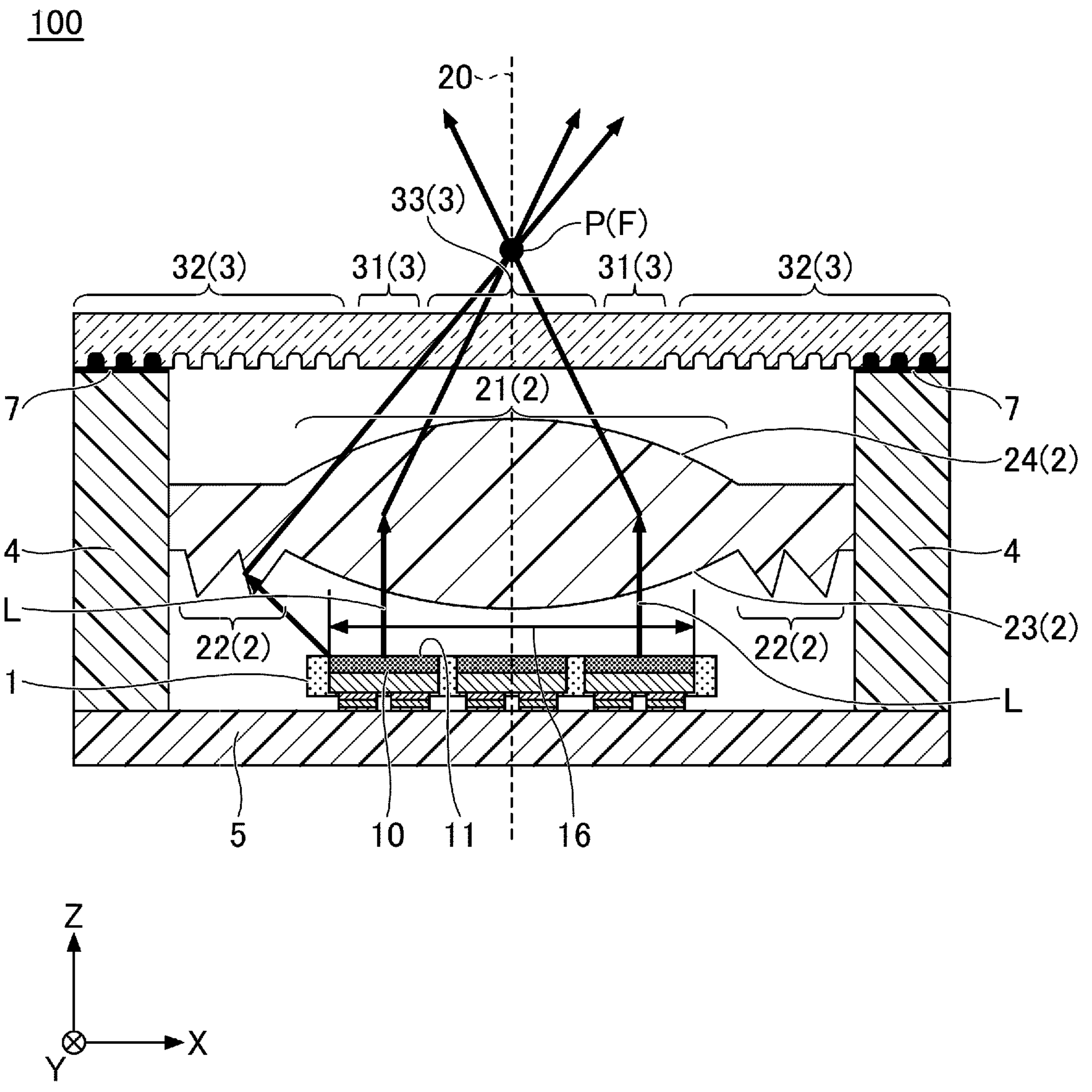
FIG. 2B is a schematic cross-sectional view illustrating a first example in other examples of a lens portion according to the embodiment
Figure 2C:
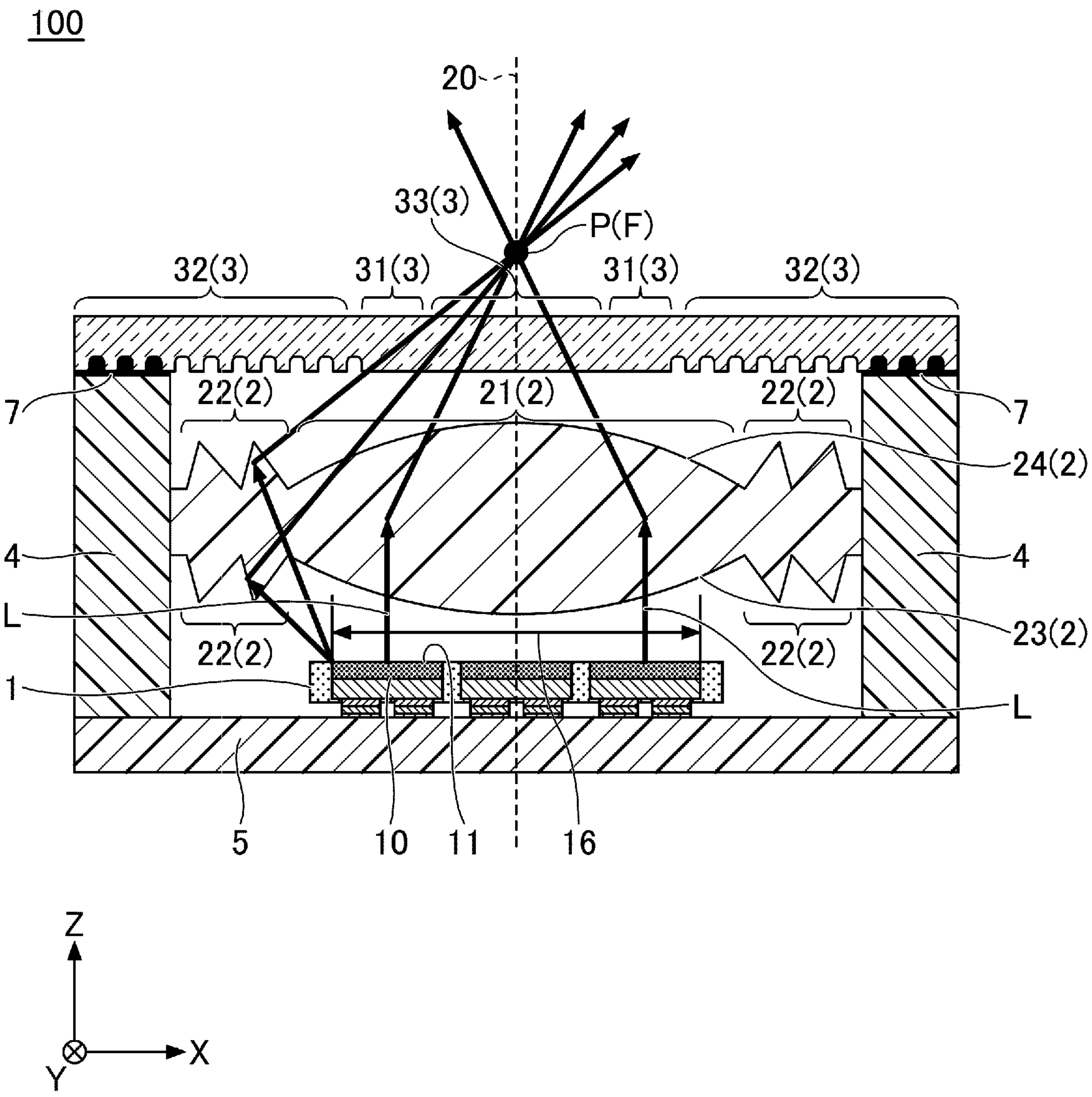
FIG. 2C is a schematic cross-sectional view illustrating a second example in other examples of the lens portion according to the embodiment

As shown in FIG. 2B, the lens portion 22 may have a Fresnel shape at an incident surface thereof. In the example shown in FIG. 2B, the incident surface is a surface of the lens 2 on the −Z side. Alternatively, as shown in FIG. 2C, the lens portion 22 may have a Fresnel shape at the incident surface and an exit surface thereof. The Fresnel shape may be formed by a plurality of protrusions in a concentric configuration, and is preferably formed by protrusions having a total-reflective surface.

In this embodiment, the lens 2 includes a convex lens. In the effective portion 21 of the lens 2, the first convex surface 23 and the second convex surface 24 form a biconvex lens. The light L from the light source 1 is once focused on a focal point F located at the center P by the first convex surface 23 and the second convex surface 24, and then emitted onto the irradiation surface as divergent light. In the lens 2 including the convex lens, the focal point F is on the +Z side of the lens 2. The light from each light emitting part 10 is concentrated on the focal point F, and then spreads. Accordingly, for example, in a case where the light emitting module 100 is mounted on a smartphone or the like, light emitted from the light emitting module 100 can be impeded from being blocked by a housing of the smartphone or the like, and the light L from the light source 1 can be efficiently emitted through the lens 2. However, the lens 2 is not limited to a biconvex lens, and may be in another form such as a plano-convex lens, a biconcave lens, a plano-concave lens, a Fresnel lens, a combined lens composed of a plurality of lenses, an array lens, a meniscus lens, an aspherical lens, or a cylindrical lens.

The lens 2 has a substantially circular outer shape in a top view. However, the lens 2 may have an outer shape such as a substantially rectangular shape, a substantially elliptical shape, or a substantially polygonal shape in a top view. Considering that an imaging range of a general imaging device is substantially rectangular, it is preferable that the outer shape of the lens 2 in a top view is a four-fold rotational symmetry shape or a two-fold rotational symmetry shape. In the lens 2, the radii of curvature of the first convex surface 23 and the second convex surface 24, the magnitude relationship between the radii of curvature, the thickness of the lens, and the like can also be changed as appropriate.

The lens 2 is configured to transmit light emitted from the light source 1, and includes at least one of resin materials such as a polycarbonate resin, an acrylic resin, a silicone resin, or an epoxy resin, and a glass material. The light transmittance of the lens 2 refers to a property of transmitting 60% or more of the light L from the light source 1.

The cover member 3 is a member disposed over the lens 2. In the example illustrated in FIG. 1 and FIG. 2A, the cover member 3 is a plate-shaped member. The cover member 3 overlaps the light source 1 and the lens 2 in a top view. The cover member 3 has a substantially circular outer shape in a top view. However, the cover member 3 may have an outer shape such as a substantially rectangular shape, a substantially elliptical shape, or a substantially polygonal shape in a top view.

In the present embodiment, the cover member 3 includes a first region 31, a second region 32, and a third region 33 in a top view. The second region 32 is located around the first region 31 and has a higher light diffusion effect than the first region 31. In FIG. 1, the second region 32 is a region indicated by dot hatching. The third region 33 is located inward of the first region 31 and is a region on which the light L from the light source 1 transmitted through the lens 2 is incident. The light diffusion effect of the third region 33 is lower than the light diffusion effect of the second region 32. Further, the light diffusion effect of the third region 33 may be substantially equal to or lower than the light diffusion effect of the first region 31. In a top view, the second region 32 overlaps the lens portion 22 of the lens 2.

Each of the inner edge and the outer edge of the second region 32 has a substantially circular shape in a top view. In other words, the second region 32 is an annular region. However, the inner edge and the outer edge of the second region 32 may be different from each other in a top view, and may have a shape such as a substantially rectangular shape, a substantially elliptical shape, or a substantially polygonal shape.

In the present embodiment, at least one of the upper surface and the lower surface of the cover member 3 in the second region 32 is a rough surface. In the example illustrated in FIG. 1 and FIG. 2A, the lower surface of the cover member 3 in the second region 32 is a rough surface. On the other hand, in the first region 31 and the third region 33, the upper surface and the lower surface of the cover member 3 are not rough surfaces but flat surfaces. The rough surface preferably has an arithmetic average roughness Ra of between 0.3 μm and 2.0 μm, inclusive, and more preferably between 0.5 μm and 1.5 μm, inclusive. The rough surface can be formed by blasting, laser processing, molding processing or the like. Alternatively, as the rough surface, a glass surface in a state before the polishing treatment may be used without performing the polishing treatment. When at least one of the upper surface and the lower surface of the cover member 3 in the second region 32 is a rough surface, the light diffusion effect of the second region 32 is higher than that of the first region 31. When the light diffusion effect of the second region 32 is higher than the light diffusion effect of the first region 31 and the light diffusion effect of the third region 33 is the lowest (preferably has substantially no light diffusion effect) among the three regions, light incident on the second region 32 among the light from the light source 1, that is, light to be stray light is diffused and emitted from the second region 32. Thus, the light transmitted through the second region 32 can be made inconspicuous, and the light transmitted through the first region 31 and a location inward of the first region 31, particularly the light transmitted through the third region 33 can be made conspicuous. Because the rough surface can be easily formed, the light diffusing effect of the second region 32 can be obtained by a simple configuration.

The light emitting module 100 of the present embodiment further includes a lens support portion 4 for supporting the lens 2. In the present embodiment, the second region 32 of the cover member 3 is disposed on the lens support portion 4 via an adhesive member 7. On the lower surface of the cover member 3, the second region 32 has a rough surface. The apparent contact area between the lens support portion 4 and the cover member 3 via the adhesive member 7 increases due to the uneven shape included in the rough surface of the second region 32, so that the support strength for the cover member 3 by the lens support portion 4 can be increased.

In the present embodiment, the rough surface may be formed by disposing a diffusing substance on at least one of the upper surface and the lower surface of the cover member 3 in the second region 32. Fillers such as titanium oxide, barium titanate, aluminum oxide, and silicon oxide can be used as the diffusing substance. The diffusing substance can be easily applied to the surface of the cover member 3, and thus the light diffusion effect of the second region 32 can be obtained by a simple configuration. Further, the rough surface may contain a diffusing substance inside the cover member 3 in the second region 32. The diffusing substance can be easily contained in the cover member 3 by containing the diffusing substance in a resin or the like constituting the cover member 3 in advance, so that the light diffusion effect of the second region 32 can be obtained by a simple configuration.

The cover member 3 is configured to transmit light emitted from the plurality of the light emitting parts 10, and includes at least one of resin materials such as a polycarbonate resin, an acrylic resin, a silicone resin, or an epoxy resin, and a glass material. The light transmittance in the third region 33 of the cover member 3 refers to a property of transmitting 80% or more of the light L from the light source 1.

In the example illustrated in FIG. 1 and FIG. 2A, the lens support portion 4 is a cylindrical member having a substantially circular shape in a top view. However, the lens support portion 4 may have an outer shape such as a substantially circular shape, a substantially elliptical shape, or a substantially polygonal shape in a top view.

The lens support portion 4 may be a member having a light shielding property. For example, in a case where the light emitting module 100 is mounted on a smartphone together with a camera for flash, it is preferable that the light emitting module 100 contains a resin material or the like containing a filler such as a light-reflecting member or a light-absorbing member to reduce influence of light emitted from the light emitting module 100 on an optical element such as a camera disposed around the light emitting module 100.

The lens 2 and the lens support portion 4 can be integrally formed by a double molding method or the like. By using the double molding method, the lens 2 having a light transmitting property and the lens support portion 4 having a light shielding property can be integrally formed.

The lens support portion 4 supports the lens 2 by attaching the outer lateral surface of the lens 2 to the inner lateral surface of the cylinder of the lens support portion 4. In addition, the lens support portion 4 supports the cover member 3 by fixing the lower surface of the cover member 3 to the upper surface (surface on the +Z side) of the cylinder using an adhesive member or the like.

Configuration Example of Light Source 1

Figure 3:
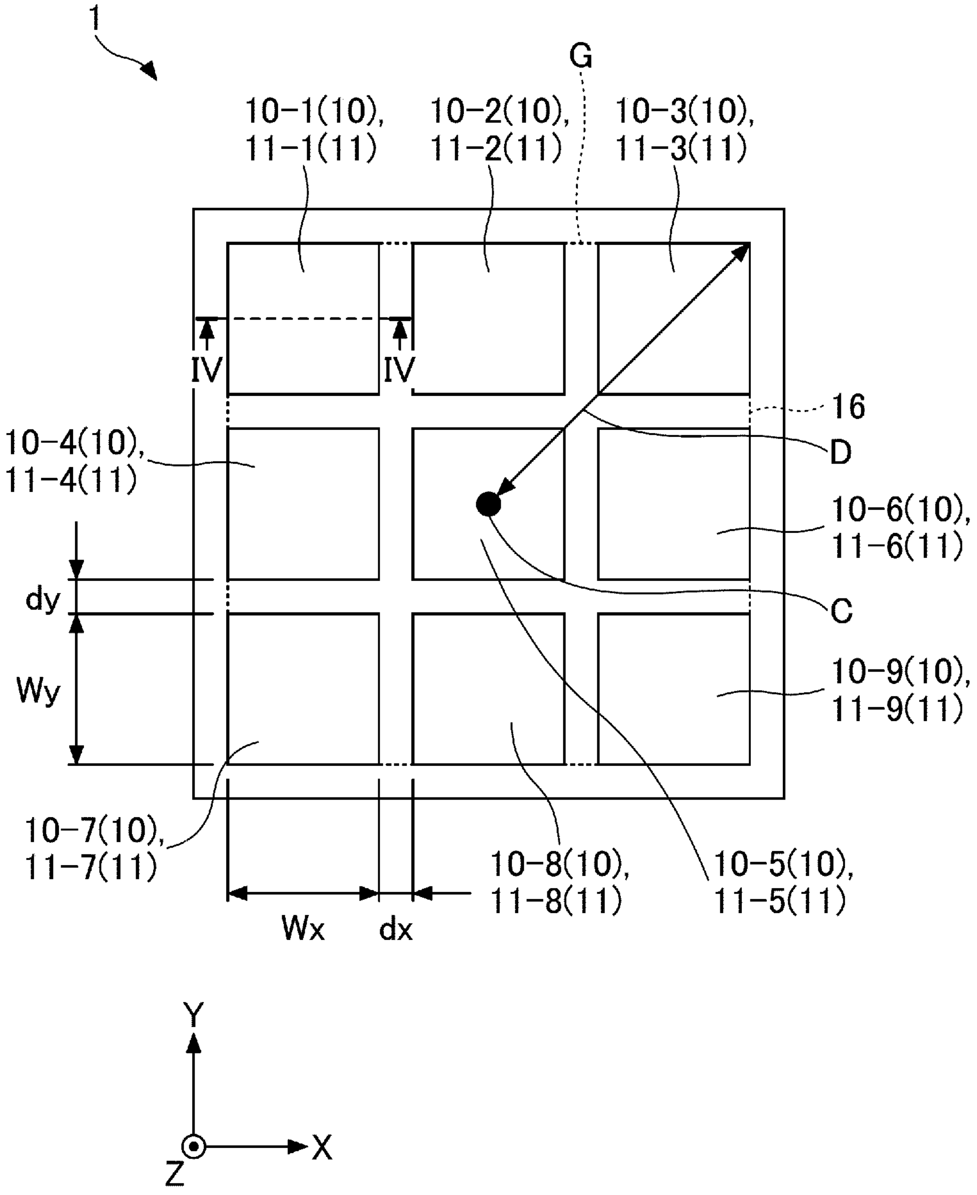
FIG. 3 is a schematic top view illustrating a light source configuration example in the light emitting module of FIG. 1.
Figure 4:
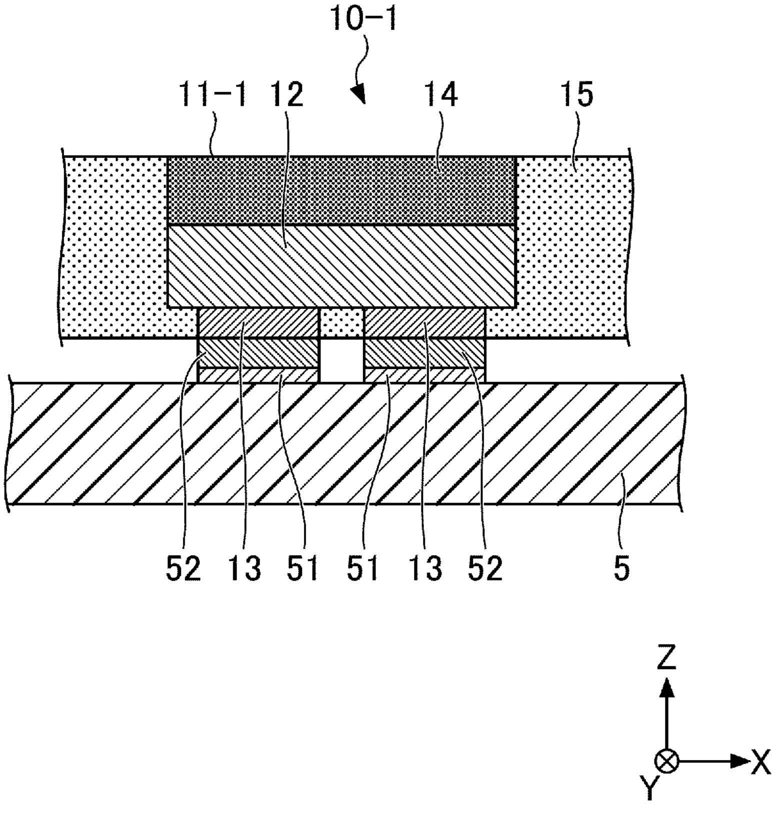
FIG. 4 is a schematic cross-sectional view taken along line IV-IV in FIG. 3.

The configuration of the light source 1 in the light emitting module 100 will be described in detail with reference to FIG. 3 and FIG. 4. FIG. 3 is a schematic top view illustrating a configuration example of the light source 1. FIG. 4 is a schematic cross-sectional view taken along line IV-IV in FIG. 3.

Light Source 1

As illustrated in FIG. 3, the light source 1 includes the plurality of the light emitting parts 10 each including the light emitting surface 11. Each of the plurality of the light emitting parts 10 emits light from the light emitting surface 11 toward the lens 2 provided on the +Z side of the light source 1. The light emitting surface 11 refers to a main light extraction surface of the light emitting part 10. The light emitting part 10 includes an LED. The light emitted from the light emitting part 10 is preferably white light, however, the light may have a specific wavelength such as blue light. The wavelength and chromaticity of the light emitted from the light emitting part 10 may be appropriately selected depending on the intended use of the light emitting module 100. The light emitting part 10 may include a LD (Laser Diode).

As illustrated in FIG. 3, in the light source 1, the plurality of the light emitting parts 10 may be arranged vertically, horizontally, or in a matrix in a top view. In the present embodiment, nine light emitting parts 10 including light emitting parts 10-1, 10-2, 10-3, 10-4, 10-5, 10-6, 10-7, 10-8, and 10-9 are provided. The nine light emitting parts 10 are the plurality of the light emitting parts. The plurality of the light emitting parts 10 is arranged in the X direction, or arranged in the X direction and the Y direction orthogonal to the X direction. In FIG. 3, the nine light emitting parts 10 are provided in the X direction and the Y direction.

The nine light emitting parts 10 include nine light emitting surfaces 11. That is, the light emitting part 10-1 includes a light emitting surface 11-1, the light emitting part 10-2 includes a light emitting surface 11-2, the light emitting part 10-3 includes a light emitting surface 11-3, the light emitting part 10-4 includes a light emitting surface 11-4, and the light emitting part 10-5 includes a light emitting surface 11-5. Further, the light emitting part 10-6 includes a light emitting surface 11-6, the light emitting part 10-7 includes a light emitting surface 11-7, the light emitting part 10-8 includes a light emitting surface 11-8, and the light emitting part 10-9 includes a light emitting surface 11-9. The light emitting surface 11-1 to the light emitting surface 11-9 are preferably disposed, in a top view, inward of the lens 2 (inward relative to the outer shape of the lens 2), and more preferably disposed inward relative to the effective portion 21. Because the light emitting part 10 and the light emitting surface 11 overlap each other in a top view, the reference numeral of the light emitting part 10 and the reference numeral of the light emitting surface 11 are illustrated together in FIG. 3. Further, in the following description, when two or more components substantially coincide with each other or overlap each other, reference numerals may be written together.

A width Wx represents the width of the light emitting surface 11 in the X direction. A width Wy represents the width of the light emitting surface 11 in the Y direction. The width Wx and the width Wy are, for example, between 50 μm and 2000 μm, inclusive, and preferably between 200 μm and 1000 μm, inclusive. The width Wx and the width Wy may be substantially equal or may be different from each other. In the present embodiment, the light emitting surfaces 11 of the light emitting parts 10 adjacent to each other are disposed at predetermined intervals in the X direction and the Y direction in a top view. A first light emitting surface interval dx in the X direction and a second light emitting surface interval dy in the Y direction are the predetermined interval in the X direction and the predetermined interval in the Y direction, respectively. From the viewpoint of light emission characteristics of the light emitting module 100, the smaller the first light emitting surface interval dx and the second light emitting surface interval dy, the more preferable. However, there are limits to the intervals at which the plurality of the light emitting parts 10 can be mounted. In order to achieve both good light emission characteristics and intervals at which the plurality of the light emitting parts 10 can be mounted, both the first light emitting surface distance dx and the second light emitting surface distance dy are preferably between 50 μm and 200 μm, inclusive.

Light Emitting Part 10

As illustrated in FIG. 4, the light emitting part 10-1 is disposed on a surface of the first mounting substrate 5 on the +Z side with a surface of the light emitting part 10-1 on +Z side serving as the light emitting surface 11-1 and with a surface of the light emitting part 10-1 opposite to the light emitting surface 11-1 serving as a mounting surface. The light emitting part 10-1 includes a light emitting element 12, a wavelength conversion member 14 provided on the surface of the light emitting element 12 on the +Z side, and a light shielding member 15 covering lateral surfaces of the light emitting element 12 and lateral surfaces of the wavelength conversion member 14, i.e., except for a surface of the wavelength conversion member 14 on the +Z side. In other words, each of the lateral surfaces of the light emitting element 12 and the lateral surfaces of the wavelength conversion member 14 is covered with the light shielding member 15. With this configuration, light leaking from the lateral surfaces of the light emitting element 12 and the lateral surfaces of the wavelength conversion member 14 is reduced, so that it is possible to irradiate a desired region with light from the light source 1.

The light shielding member 15 is provided between adjacent light emitting parts 10 in the plurality of the light emitting parts 10 included in the light source 1, and integrally holds the plurality of the light emitting elements 12 and the plurality of wavelength conversion members 14. With this configuration, it is possible to collectively mount the plurality of the light emitting parts 10 and to narrow the intervals between the light emitting parts 10.

It is preferable that at least one pair of positive and negative electrodes 13 (for example, a p-side electrode and an n-side electrode) is provided on a surface of the light emitting element 12 opposite to the light emitting surface 11-1. In the present embodiment, the outer shape of the light emitting surface 11-1 in a top view is substantially rectangular. The outer shape of the light emitting surface 11-1 in a top view may be a substantially circular shape, a substantially elliptical shape, or a polygonal shape such as a substantially triangular shape or a substantially hexagonal shape.

The light emitting element 12 is preferably made of various semiconductors such as a group III-V compound semiconductor and a group II-VI compound semiconductor. As semiconductors, nitride-based semiconductors such as $In_XAl_YGa_{1-X-Y}N$ ($0 \le X$, $0 \le Y$, $X+Y \le 1$) are preferably used, and InN, AlN, GaN, InGaN, AlGaN, InGaAlN, and the like can also be used. The light emitting element 12 is, for example, an LED or an LD. The emission peak wavelength of the light emitting element 12 is preferably 400 nm or greater and 530 nm or less, more preferably 420 nm or greater and 490 nm or less, and even more preferably 450 nm or greater and 475 nm or less, considering emission efficiency, excitation of the wavelength conversion substance, and the like.

The wavelength conversion member 14 is a member having, for example, a substantially rectangular outer shape in a top view. The wavelength conversion member 14 is provided to cover the upper surface of the light emitting element 12. The wavelength conversion member 14 can be formed using a light-transmissive resin material or an inorganic substance such as a ceramic or glass. As the resin material, a thermosetting resin such as a silicone resin, a silicone-modified resin, an epoxy resin, an epoxy-modified resin, or a phenol resin can be used. A silicone resin or a modified resin thereof having high light resistance and heat resistance is particularly preferable. The term "light-transmissive" as used herein indicates transmitting, preferably, at least 60% of the light from the light emitting element 12. The wavelength conversion member 14 may be made of a thermoplastic resin such as a polycarbonate resin, an acrylic resin, a methylpentene resin, or a polynorbornene resin. Further, the wavelength conversion member 14 may contain a diffusing substance or a wavelength conversion substance that converts the wavelength of at least part of the light from the light emitting element 12 in the resin described above. For example, the wavelength conversion member 14 may be a resin material, ceramic, glass, or the like containing a wavelength conversion substance, a sintered body of a wavelength conversion substance, or the like. Furthermore, the wavelength conversion member 14 may be a multilayer member in which a resin layer containing a wavelength conversion substance or a diffusing substance is disposed on surfaces of a molded body, made of resin, ceramic, glass, or the like, on the ±Z side.

Examples of the wavelength conversion substance contained in the wavelength conversion member 14 include a yttrium aluminum garnet based phosphor (e.g., $(Y, Gd)_3(Al, Ga)_5O_{12}$:Ce), a lutetium aluminum garnet based phosphor (e.g., $Lu_3(Al, Ga)_5O_{12}$:Ce), a terbium aluminum garnet based phosphor (e.g., $Tb_3(Al, Ga)_5O_{12}$:Ce), a CCA-based phosphor (e.g., $Ca_{10}(PO_4)_6Cl_2$:Eu), an SAE-based phosphor (e.g., $Sr_4Al_{14}O_{25}$:Eu), a chlorosilicate-based phosphor (e.g., $Ca_8MgSi_4O_{16}Cl_2$:Eu), a silicate-based phosphor (e.g., $(Ba, Sr, Ca, Mg)_2SiO_4$:Eu), an oxynitride phosphor such as a β sialon-based phosphor (e.g., $(Si, Al)_3(O, N)_4$:Eu) or an a sialon-based phosphor (e.g., $Ca(Si, Al)_{12}(O, N)_{16}$:Eu), a nitride based phosphor such as an LSN based phosphor (e.g., $(La, Y)_3Si_6N_{11}$:Ce), a BSESN based phosphor (e.g., $(Ba, Sr)_2Si_5N_8$:Eu), a SLA based phosphor (e.g., $SrLiAl_3N_4$:Eu) a CASN based phosphor (e.g., $CaAlSiN_3$:Eu) and a SCASN based phosphor (e.g., $(Sr, Ca)AlSiN_3$:Eu), a fluoride based phosphor such as a KSF based phosphor (e.g., $K_2SiF_6$:Mn), a KSAF based phosphor (e.g., $K_2(Si_{1-x}Al_x)F_{6-x}$:Mn where x satisfies $0<x<1$) and a MGF phosphor (e.g., $3.5MgO{\cdot}0.5MgF_2{\cdot}GeO_2$:Mn), quantum dots with a perovskite structure (e.g., (Cs, FA, MA) (Pb, Sn) $(F, Cl, Br, I)_3$ where FA and MA represent formamidinium and methylammonium, respectively), II-VI group quantum dots (e.g., CdSe), III-V group quantum dots (for example, InP), or quantum dots with a chalcopyrite structure (e.g., (Ag, Cu) (In, Ga) $(S, Se)_2$). The wavelength conversion substance described above is in form of particles. One of these wavelength conversion substances may be used of these wavelength conversion alone, or two or more substances may be used in combination.

In the present embodiment, the light emitting module 100 uses a blue light emitting element as the light emitting element 12, and the wavelength conversion member 14 contains a wavelength conversion substance that converts light emitted from the light emitting element 12 into yellow light, thus emitting white light. As the diffusing substance contained in the wavelength conversion member 14, for example, titanium oxide, barium titanate, aluminum oxide, silicon oxide, or the like can be used.

The light shielding member 15 is a member that covers the lateral surfaces of the light emitting element 12 and the wavelength conversion member 14. The light shielding member 15 directly or indirectly covers the lateral surfaces of the light emitting element 12 and the wavelength conversion member 14. An upper surface of the wavelength conversion member 14 is exposed from the light shielding member 15, and is the light emitting surface 11-1 of the light emitting part 10-1. The light shielding member 15 may be separated between adjacent light emitting parts of the plurality of the light emitting parts 10. In order to improve the light extraction efficiency, the light shielding member 15 is preferably formed of a member having a high light reflectance. For example, a resin material containing a light reflective substance such as a white pigment can be used for the light shielding member 15.

Examples of the light reflective substance include titanium oxide, zinc oxide, magnesium oxide, magnesium carbonate, magnesium hydroxide, calcium carbonate, calcium hydroxide, calcium silicate, magnesium silicate, barium titanate, barium sulfate, aluminum hydroxide, aluminum oxide, zirconium oxide, silicon oxide, and the like, and it is preferable to use one of the above-mentioned substances alone or a combination of two or more of the substances. Further, for the resin material, a resin material containing a thermosetting resin such as an epoxy resin, an epoxy-modified resin, a silicone resin, a silicone-modified resin, or a phenol resin as a main component is preferably used as a base material thereof. The light shielding member 15 may be formed of a member configured to transmit visible light as necessary.

The light emitting part 10 is electrically connected to wiring 51 of the first mounting substrate 5. The first mounting substrate 5 preferably includes the wiring 51 disposed at a surface thereof. The first mounting substrate 5 may include the wiring 51 inside thereof. The light emitting part 10 and the first mounting substrate 5 are electrically connected to each other by connecting the wiring 51 of the first mounting substrate 5 and the at least one pair of positive and negative electrodes 13 of the light emitting part 10 via a conductive adhesive member 52. The configuration, size, and the like of the wiring 51 of the first mounting substrate 5 are set in accordance with the configuration, size, and the like of the electrode 13 of the light emitting part 10.

As a base material of the first mounting substrate 5, it is preferable to use an insulating material, a material that does not easily transmit light emitted from the light emitting part 10, external light, or the like, and a material having a certain strength. Specifically, the first mounting substrate 5 can be formed by using ceramics such as alumina, aluminum nitride, mullite, and silicon nitride, or a resin such as phenol resin, epoxy resin, polyimide resin, BT resin (Bismaleimide Triazine resin), polyphthalamide, and polyester resin as a base material.

The wiring 51 can be made of at least one of copper, iron, nickel, tungsten, chromium, aluminum, silver, gold, titanium, palladium, rhodium, or an alloy thereof. In addition, a layer of silver, platinum, aluminum, rhodium, gold, an alloy thereof, or the like may be provided on the surface layer of the wiring 51 from the viewpoint of wettability and/or light reflectivity of the conductive adhesive member 52.

Main Effect of Cover Member 3

Figure 5:
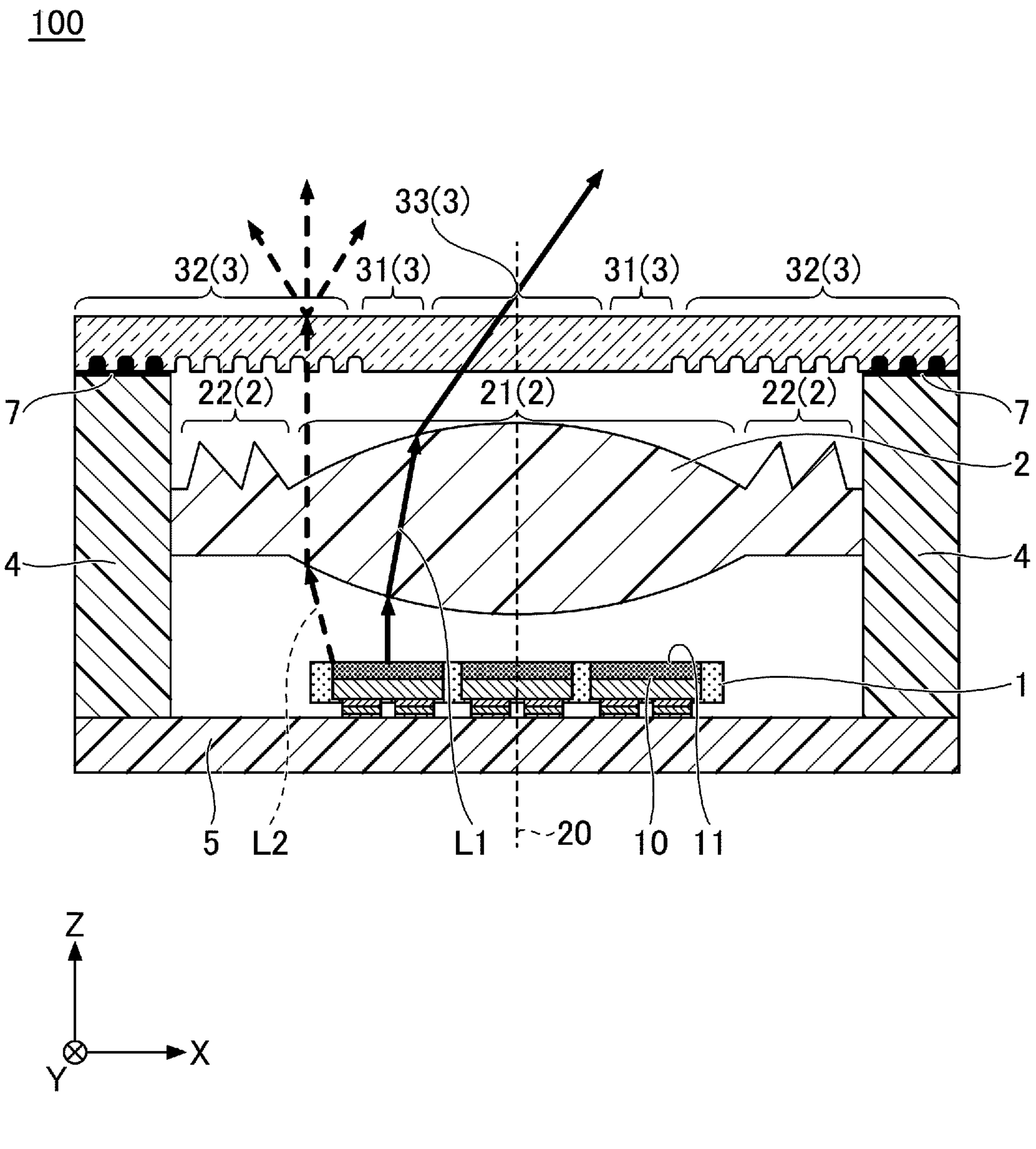
FIG. 5 is a schematic cross-sectional view taken along the line II-II in FIG. 1, and is a first diagram illustrating the effect of a cover member in the light emitting module of FIG. 1.
Figure 6:
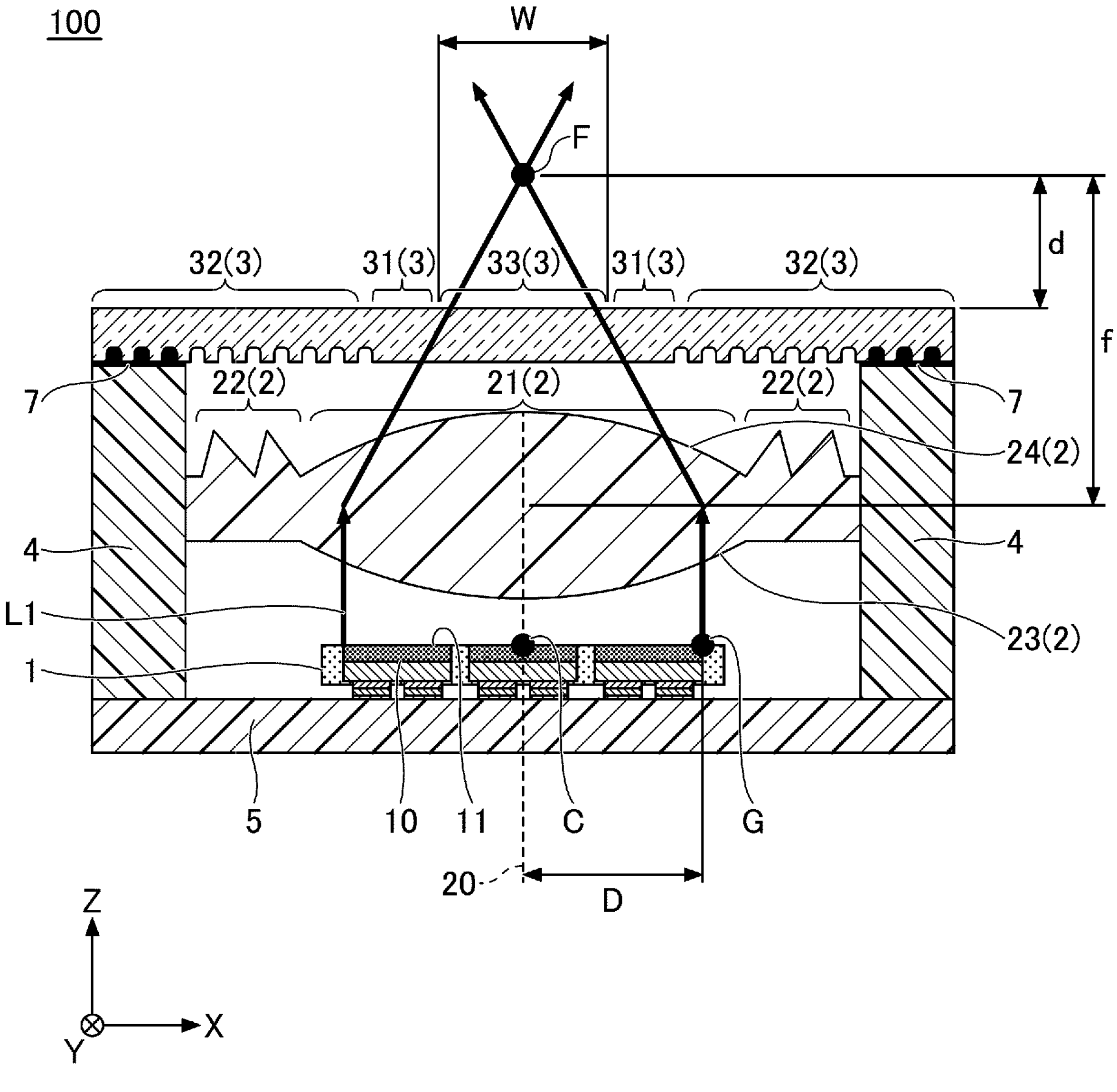
FIG. 6 is a schematic cross-sectional view taken along line VI-VI FIG. 1, and is a second diagram illustrating the effect of the cover member in the light emitting module of FIG. 1.

FIG. 5 and FIG. 6 are diagrams illustrating the effect of the cover member 3 in the light emitting module 100. FIG. 5 and FIG. 6 schematically illustrate a cross section of the light emitting module 100 taken along the line II-II in FIG. 1, similarly to FIG. 2A.

In FIG. 5, light L1 indicated by a solid line is light that is emitted from the light source 1, transmitted through the vicinity of the center of the effective portion 21 of the lens 2, and then transmitted through the third region 33 of the cover member 3. Light L2 indicated by a broken line is light emitted from the light source 1, transmitted through the vicinity of the outer edge of the effective portion 21 of the lens 2, and then transmitted through the second region 32 of the cover member 3.

As illustrated in FIG. 5, light L2 is diffused by the second region 32, which allows for reducing stray light that is likely to be generated due to light transmitted through the vicinity of the outer edge of the effective portion 21 or the lens portion 22 in the lens 2. Accordingly, stray light included in light emitted from the light emitting module 100 can be reduced. Thus, the light emitting module 100 can emit light to a desired region, and light emitted to regions other than the desired region can be reduced. In addition, by providing the second region 32 to overlap the lens portion 22 in a top view, the Fresnel shape or the like of the lens portion 22 is less likely to be visually recognized from the outside of the light emitting module 100. Thus, the appearance of the light emitting module 100 can be improved.

In FIG. 3 and FIG. 6, f represents the focal length of the lens 2, d represents the shortest distance from the focal point F of the lens 2 to the upper surface of the cover member 3 in the direction along the optical axis 20 of the lens 2, and D represents the longest distance from a center C of the light emitting region 16 to an outer edge G of the light emitting region 16 in the direction along the light emitting surface 11. In the present embodiment, nine light emitting parts 10 are arranged in a 3×3 matrix, and the light emitting region 16 has a substantially square shape. Therefore, the longest distance D is a distance from the center C of the light emitting part 10 at the center (second row and second column) to a corner of the square surrounded by the outer edge G of the light emitting region 16. The maximum width W of the third region 33 in the direction along the light emitting surface 11 may be represented by the following formula:

$$W \geq 2 \times D \times d/f$$

With the above-described configuration, stray light that is likely to be generated due to light transmitted through the vicinity of the outer edge of the lens portion 22 or the effective portion 21 in the lens 2 is reduced by the light diffusion effect of the second region 32. Accordingly, stray light included in light emitted from the light emitting module 100 can be reduced. Thus, the light emitting module 100 can emit light to a desired region, and light emitted to regions other than the desired region can be reduced. Further, the light L1 emitted from the light source 1 and transmitted through the effective portion 21 of the lens 2 is transmitted through the first region 31 and a location inward of the cover member 3, particularly the third region 33, so that it is possible to reduce light diffusion in the cover member 3 and to irradiate a desired region with the light.

EXAMPLES AND REFERENCE EXAMPLES

Hereinafter, examples and reference examples will be described, but the present disclosure is not limited to these examples.

Figure 7A:
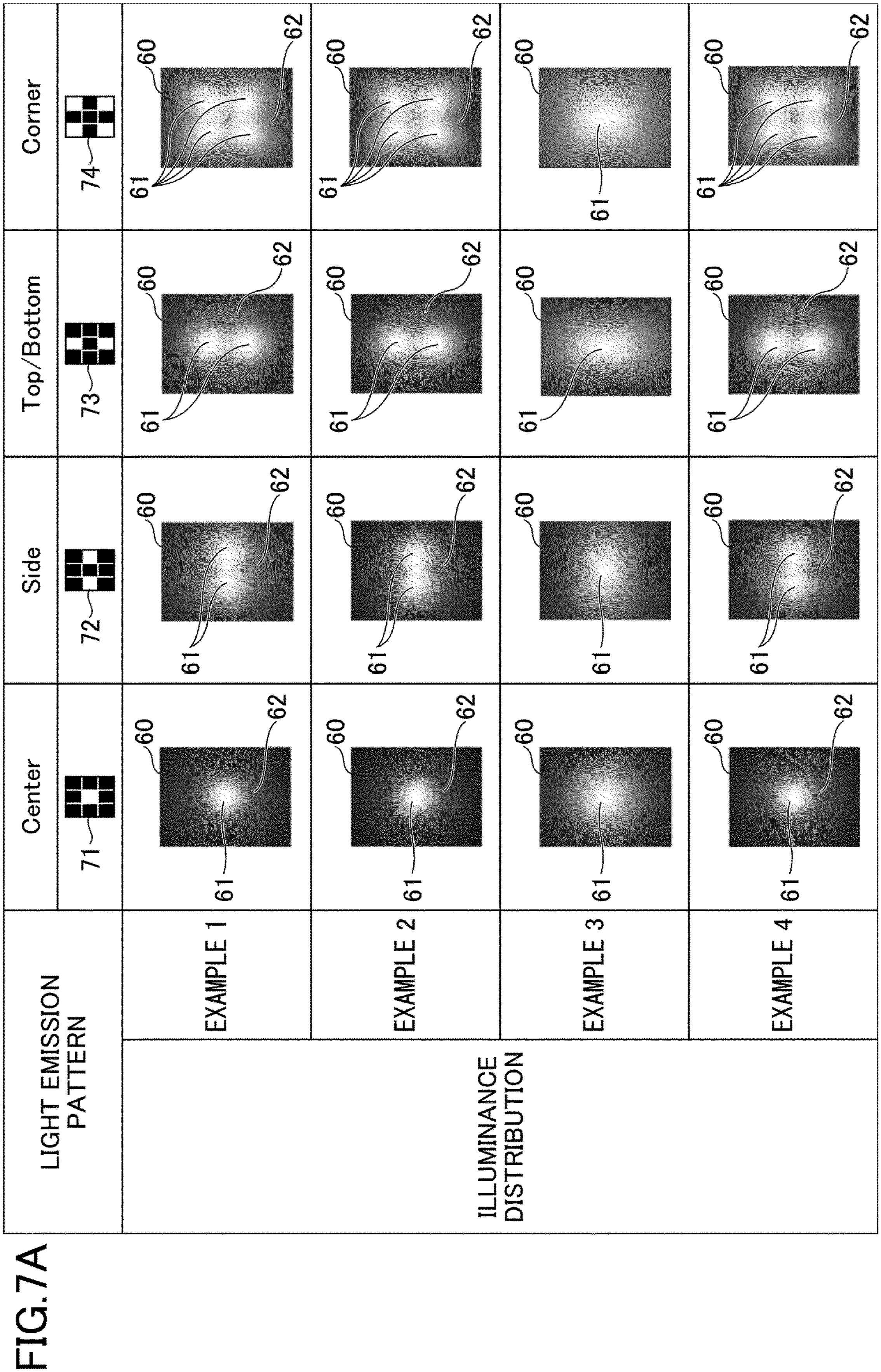
FIG. 7A is a diagram illustrating illuminance distributions of light emitting modules according to examples and reference examples.

FIG. 7A is a diagram illustrating simulation results of illuminance distributions of light emitting modules according to examples and the reference examples. Simulation analysis was performed using the lighting design software LightTools, manufactured by Synopsys, Inc. In FIG. 7A, Example 1 and Example 2 are examples, and Example 3 and Example 4 are reference examples. Main configurations of the light emitting modules according to Example 1 to Example 4 are described below.

Example 1

Number of the light emitting parts 10: 9 (3×3 matrix arrangement)
Shape of the effective portion 21 in the lens 2: convex lens
Material of the lens 2: polycarbonate resin
Material of the lens support portion 4: polycarbonate resin
Color of the lens support portion 4: white
Material of the cover member 3: glass
Surface of the cover member 3: In the second region 32, the lower surface of the cover member 3 is a rough surface, and in the first region 31 and the third region 33, both surfaces of the cover member 3 are not rough surfaces but flat surfaces.

Example 2

This example is the same as Example 1 except that the color of the lens support portion 4 is black.

Example 3

This example is different from Example 1 in that the material of the cover member is a polycarbonate resin, a hard coat layer for protecting the surface from scratches and stains is provided on the entire upper surface of the cover member, and the entire lower surface of the cover member is a rough surface. The hard coat layer contains silica, and the surface on which the hard coat layer is formed has a higher light diffusion effect than a flat surface which is not a rough surface.

Example 4

This example is the same as Example 1 except that the entire upper and lower surfaces of the cover member are not rough surfaces but flat surfaces.

FIG. 7A illustrates the illuminance distributions obtained on an irradiation surface 60 for four types of the light emission patterns in each of Example 1 to Example 4. In FIG. 7A, the irradiation surface 60 is viewed in the +Z direction. Each illuminance distribution of Example 1 to Example 4 includes irradiation light 61 and stray light 62. The irradiation light 61 is light obtained on the irradiation surface 60 from light emitted from the light emitting part and transmitted through the vicinity of the center of the effective portion of the lens. The irradiation light 61 is light with which a desired region is irradiated. The stray light 62 is light obtained on the irradiation surface 60 from light transmitted through the vicinity of the outer edge of the effective portion of the lens or the lens portion. The stray light 62 is light with which a region other than the desired region is irradiated. As the illuminance of the stray light 62 increases (in other words, as the amount of stray light 62 increases), the illuminance of the irradiation light 61 decreases. That is, as the illuminance of the stray light 62 becomes higher, the outer edge of the irradiation light 61 becomes unclear.

There are four types of the light emission patterns including “Center”, “Side”, “Top/Bottom”, and “Corner.” “Center” is a light emission pattern in which only one light emitting part located at the center (second row and second column) among nine light emitting parts arranged in a 3×3 matrix is caused to emit light. “Side” is a light emission pattern in which only two light emitting parts located at the second row and the first column and the second row and the third column among nine light emitting parts arranged in a 3×3 matrix are caused to emit light. “Top/Bottom” is a light emission pattern in which only two light emitting parts located at the first row and the second column and the third row and the second column among nine light emitting parts arranged in a 3×3 matrix are caused to emit light. “Corner” is a light emission pattern in which among nine light emitting parts arranged in a 3×3 matrix, only the light emitting parts at four corners (located at the first row and the first column, the first row and the third column, the third row and the first column, and the third row and the third column) are caused to emit light. Light emission patterns 71 to 74 in FIG. 7A illustrate schematic top views of the light source. The light emission patterns 71, 72, 73 and 74 correspond to “Center”, “Side”, “Top/Bottom”, and “Corner”, respectively. On the irradiation surface 60, the irradiation light 61 is obtained at a position opposite to the position of the light emitting part in the light emission pattern with respect to the point on the optical axis of the lens.

As illustrated in FIG. 7A, in Example 1 and Example 2, the light from the light source 1 is transmitted through the third region 33 of the cover member 3, so that the irradiation light 61 emitted a as partial irradiation according to the light emission pattern is obtained on the irradiation surface 60. On the other hand, in Example 3, the light from each of the light emitting parts of the light source diffuses and spreads in the hard coat layer of the cover member, so that the light from each of the light emitting parts of the light source is not separated on the irradiation surface 60. As a result, in the irradiation surface 60 of Example 3, the irradiation light 61 is not obtained as partial irradiation according to the light emission pattern.

In Example 1 and Example 2, the illuminance of the stray light 62 in the vicinity of the irradiation light 61 is lower than that in Example 4 due to the light diffusion effect of the second region 32 of the cover member 3. Thereby, compared to Example 4, the outer edge of the irradiation light 61 is clear, and the stray light on the irradiation surface 60 is reduced.

In addition, in Example 2, with the black lens support portion 4, the light shielding property of the lens support portion 4 is improved, which allows for further reducing the stray light 62 compared to that in Example 1, so that the stray light on the irradiation surface 60 is further reduced.

Figure 7B:
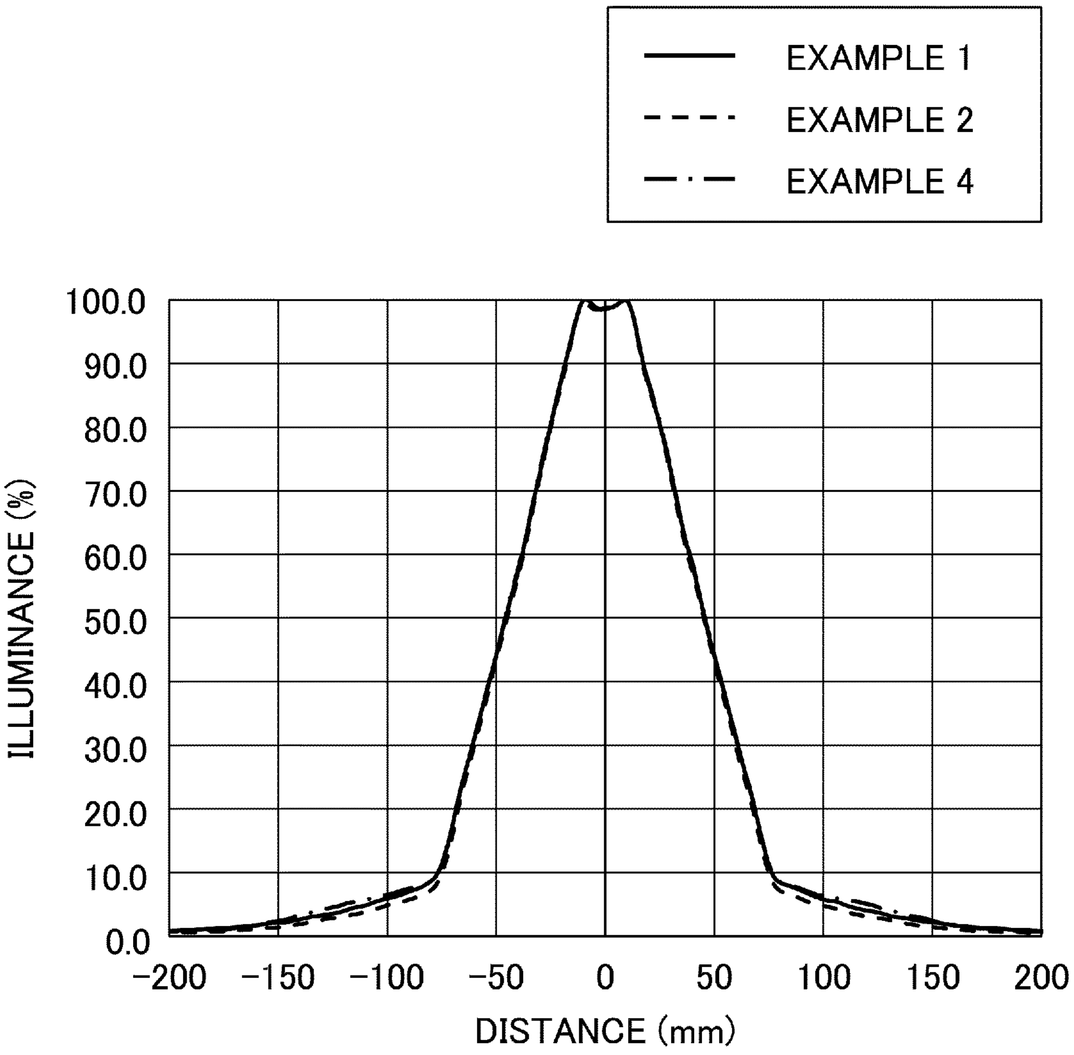
FIG. 7B is a first diagram illustrating a simulation result example of an illuminance distribution on an irradiation surface.
Figure 7C:
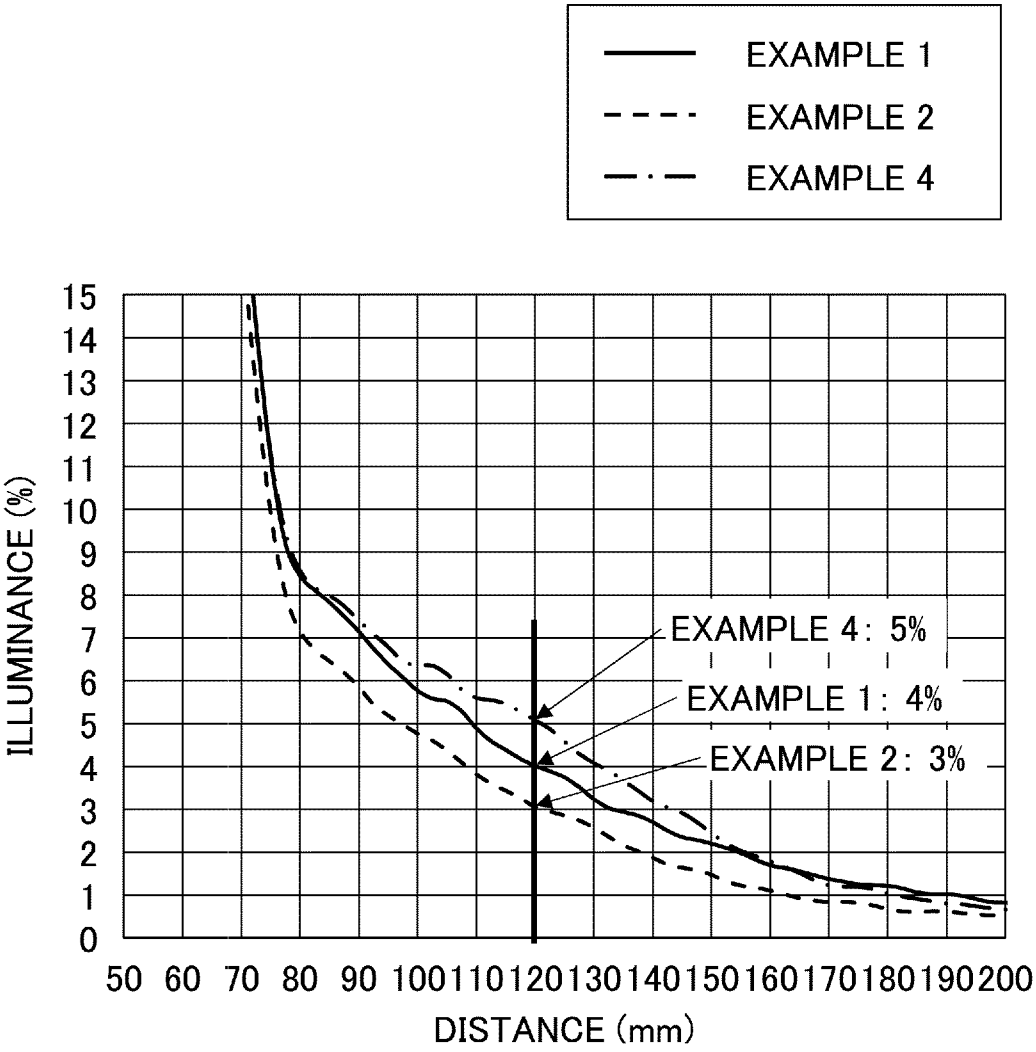
FIG. 7C is a second diagram illustrating the simulation result example of the illuminance distribution on the irradiation surface.

FIG. 7B and FIG. 7C are diagrams each illustrating a simulation result example of an illuminance distribution on an irradiation surface when a light source is caused to emit light in a light emission pattern of "Center". The simulation result was also obtained by using the lighting design software LightTools, manufactured by Synopsys, Inc. as described above.

FIG. 7B illustrates a cross-sectional illuminance distribution at locations at the distances of −200 mm or greater and 200 mm or less from the center of the irradiation light in the X direction on the irradiation surface. FIG. 7C illustrates a cross-sectional illuminance distribution on the irradiation surface illustrated in FIG. 7B, showing an enlarged range in which the distance from the center of the irradiation light in the X direction is 50 mm or greater and 200 mm or less, as a range in which the distance from the center of the irradiation light in the X direction is in the vicinity of 120 mm. The relative difference in illuminance among Example 1, Example 2, and Example 4 described above is the largest at the distance of 120 mm from the center of the irradiation light in the X direction on the irradiation surface. The center of the irradiation light on the irradiation surface substantially coincides with the center of the light emitting region in the direction along the light emitting surface. In FIG. 7B and FIG. 7C, the maximum illuminance in the cross section of the irradiation surface is set to 100%. The distance between the cover member of the light emitting module and the irradiation surface is 150 mm. While the cross-sectional illuminance distributions in the X direction are illustrated in FIG. 7B and FIG. 7C, because the illuminance distribution of the irradiation light is substantially point-symmetric with respect to the center of the irradiation light in the irradiation surface, substantially the same cross-sectional illuminance distribution is obtained in any cross section as long as the cross section passes through the center of the irradiation light in the irradiation surface.

As illustrated in FIG. 7C, at a position where the distance from the center of the irradiation light in the X direction is 120 mm on the irradiation surface, the illuminance in Example 1 is 4%, the illuminance in Example 2 is 3%, and the illuminance in Example 4 is 5%. That is, in Example 1 and Example 2, when the distance between the cover member of the light emitting module and the irradiation surface is 150 mm and the maximum illuminance of the irradiation light of the light emitting module on the irradiation surface is 100%, the illuminance at a position where the distance from the center of the irradiation light is 120 mm on the irradiation surface is less than 58. In contrast, the illuminance in Example 4 is 5%. Therefore, the illuminance of stray light in Example 1 and Example 2 is lower than the illuminance of stray light in Example 4.

As described above, in Example 1 and Example 2, compared to Example 3 and Example 4, the light emitting module 100 can irradiate a desired region with light while reducing stray light on the irradiation surface 60, and light emitted to regions other than the desired region can be reduced.

MODIFIED EXAMPLES

Hereinafter, various modified examples of the light emitting module according to the embodiment will be described.

Modified Example 1

Figure 8:
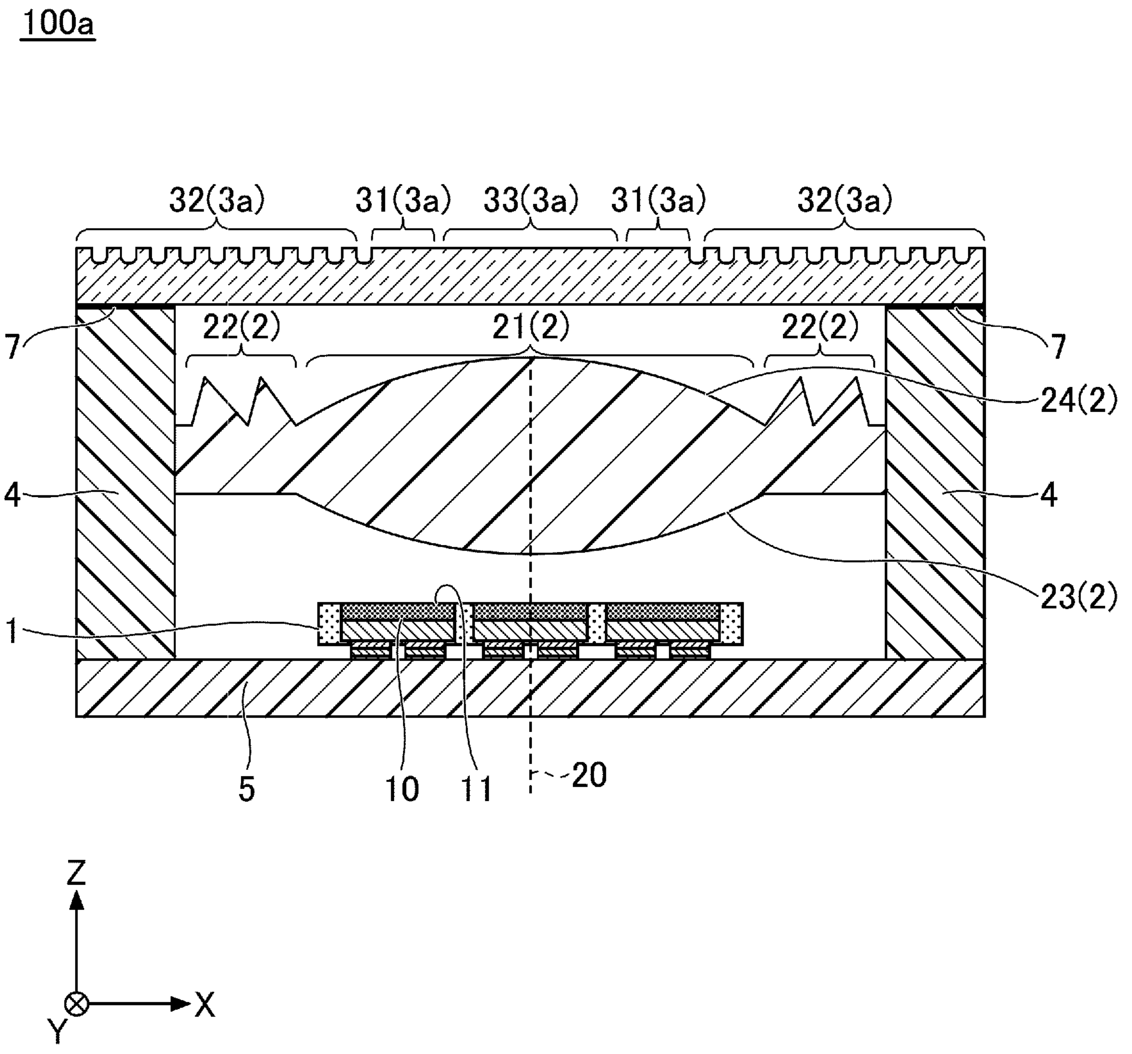
FIG. 8 a schematic cross-sectional view is illustrating an example of a light emitting module according to Modified Example 1.

FIG. 8 is a schematic cross-sectional view illustrating an example of a light emitting module 100*a* according to Modified Example 1. A top view of the light emitting module 100*a* is substantially the same as FIG. 1. The schematic cross-sectional view of FIG. 8 illustrates a cross-section of the light emitting module 100*a* corresponding to the line II-II of FIG. 1. This also applies to the cross-sectional views of FIG. 11 to FIG. 13 described below.

The light emitting module 100*a* of the present modified example is different from the light emitting module 100 according to the embodiment in that the rough surface in the second region 32 is provided on the upper surface (surface on the +Z side) of a cover member 3*a*. Also in such a light emitting module 100*a*, it is possible to obtain an effect of irradiating a desired region with light while reducing stray light on an irradiation surface.

Modified Example 2

Figure 9:
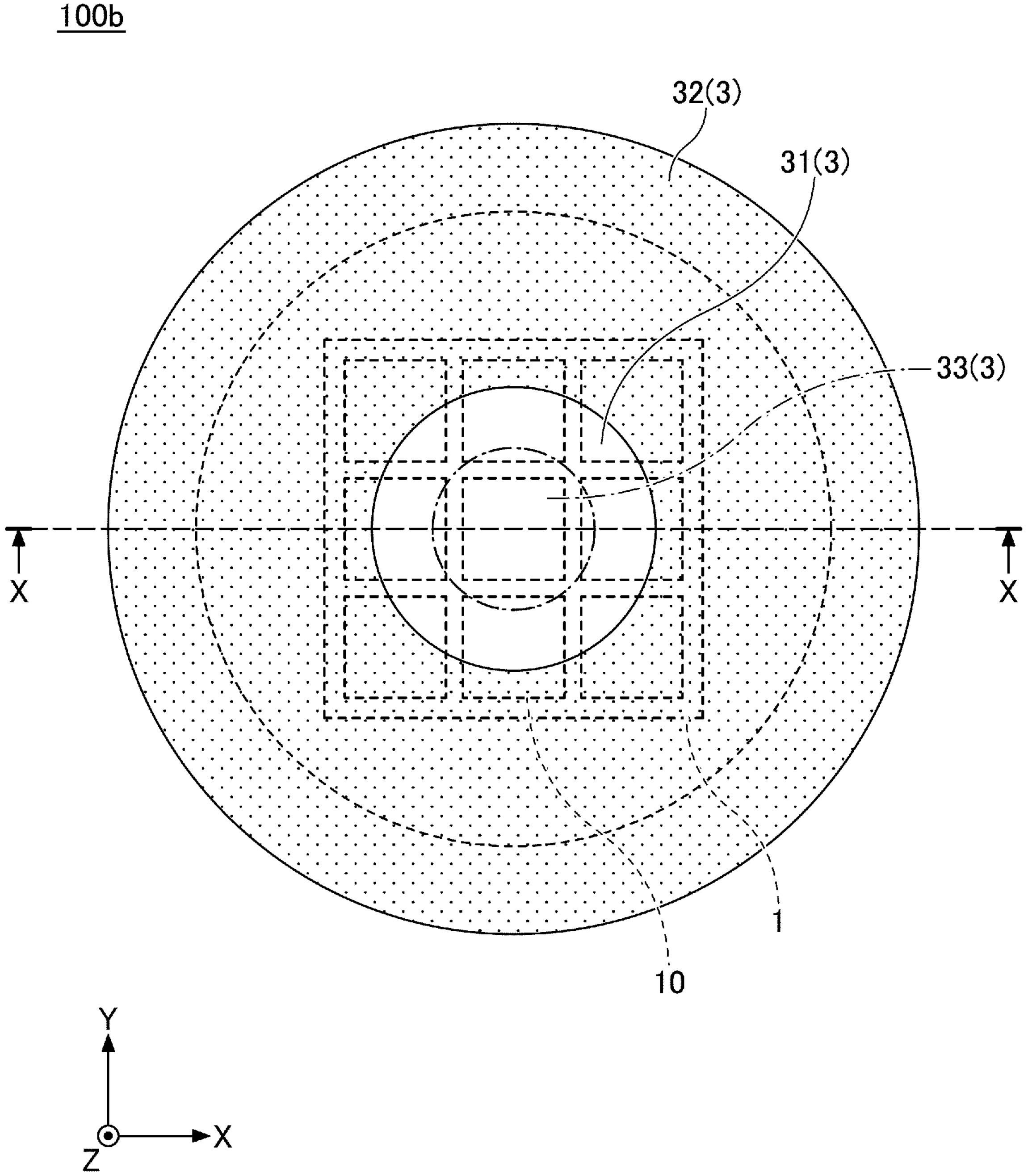
FIG. 9 is a schematic top view illustrating an example of a light emitting module according to Modified Example 2.
Figure 10:
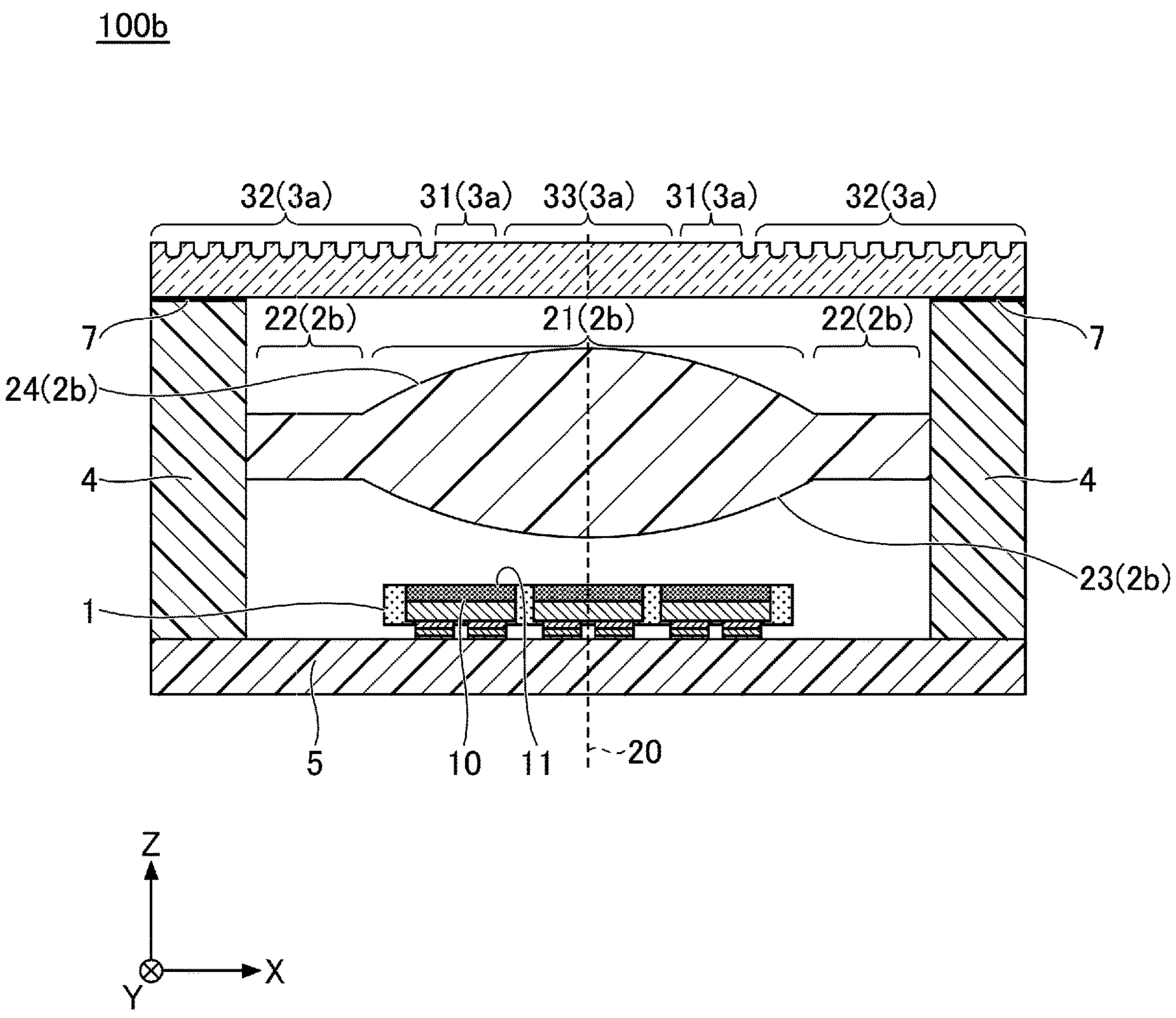
FIG. 10 is a schematic cross-sectional view taken along line X-X in FIG. 9.

FIG. 9 and FIG. 10 are diagrams illustrating an example of a light emitting module 100*b* according to Modified Example 2. FIG. 9 is a schematic top view of the light emitting module 100*b*. FIG. 10 is a schematic cross-sectional view taken along line X-X in FIG. 9. In the present modified example, the light emitting module 100*b* is different from the light emitting module 100*a* according to Modified Example 1 in including a lens 2*b* that does not have a Fresnel shape in a light exit surface thereof. Also in such a light emitting module 100*b*, it is possible to obtain an effect of irradiating a desired region with light while reducing stray light on an irradiation surface.

Modified Example 3

Figure 11:
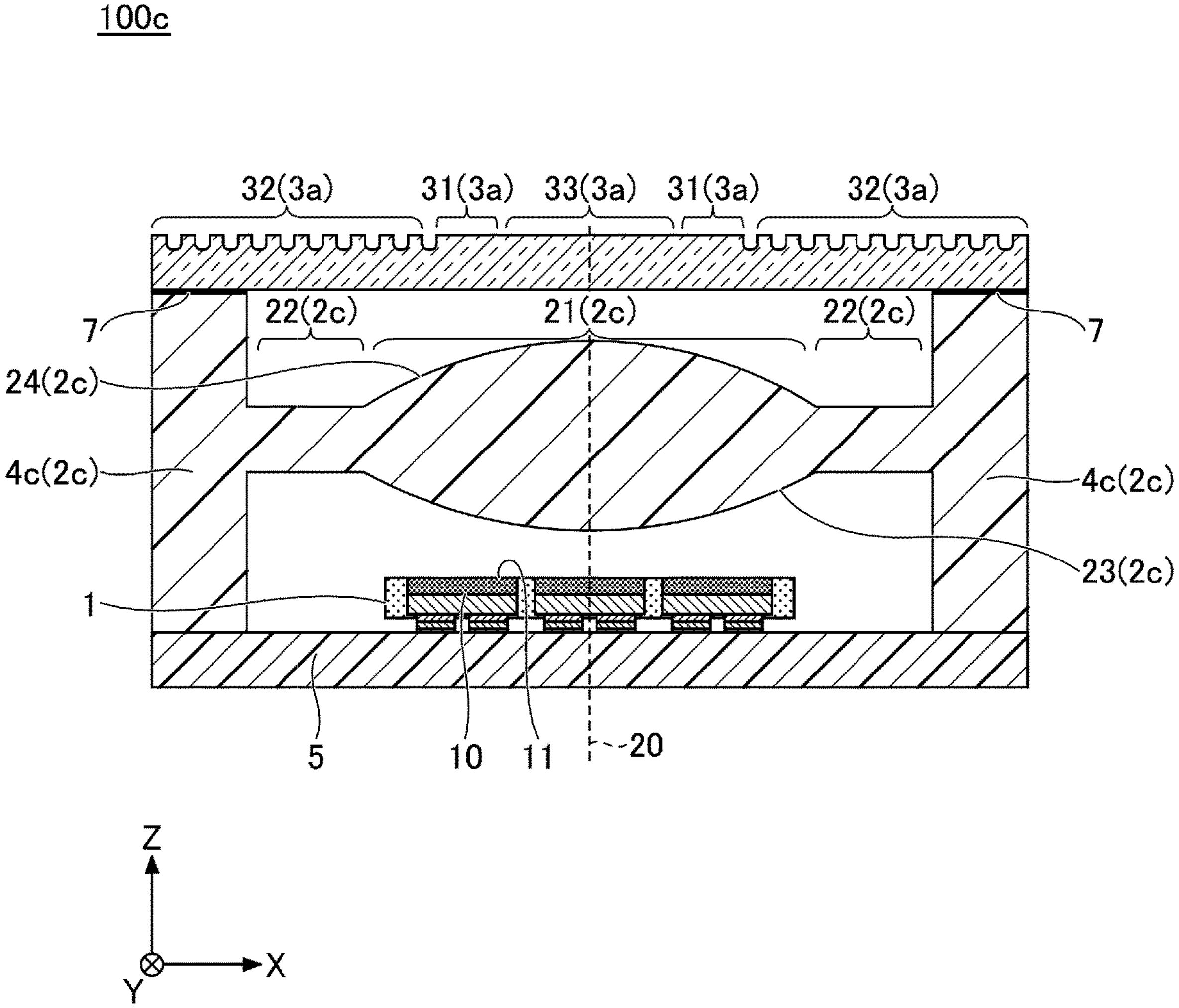
FIG. 11 is a schematic cross-sectional view illustrating an example of a light emitting module according to Modified Example 3.

FIG. 11 is a schematic cross-sectional view illustrating an example of a light emitting module 100*c* according to Modified Example 3. A top view of the light emitting module 100*c* is substantially the same as FIG. 9. The schematic cross-sectional view of FIG. 11 illustrates a cross-section of the light emitting module 100*c* corresponding to the line X-X of FIG. 9. In the present modified example, the light emitting module 100*c* is different from the light emitting module 100*b* according to Modified Example 2 in that a lens support portion 4*c* corresponding to the lens support portion 4 in FIG. 10 is integrally provided with the lens 2*c* using the same material as the lens 2*c*. The lens 2*c* can be formed by, for example, molding the lens support portion 4*c* together with the effective portion 21, the lens portion 22, and the like using a resin material or the like configured to transmit light. Therefore, the lens support portion 4*c* is configured to transmit light. Also in such a light emitting module 100*c*, it is possible to obtain an effect of irradiating a desired region with light while reducing stray light on an irradiation surface.

Modified Example 4

Figure 12A:
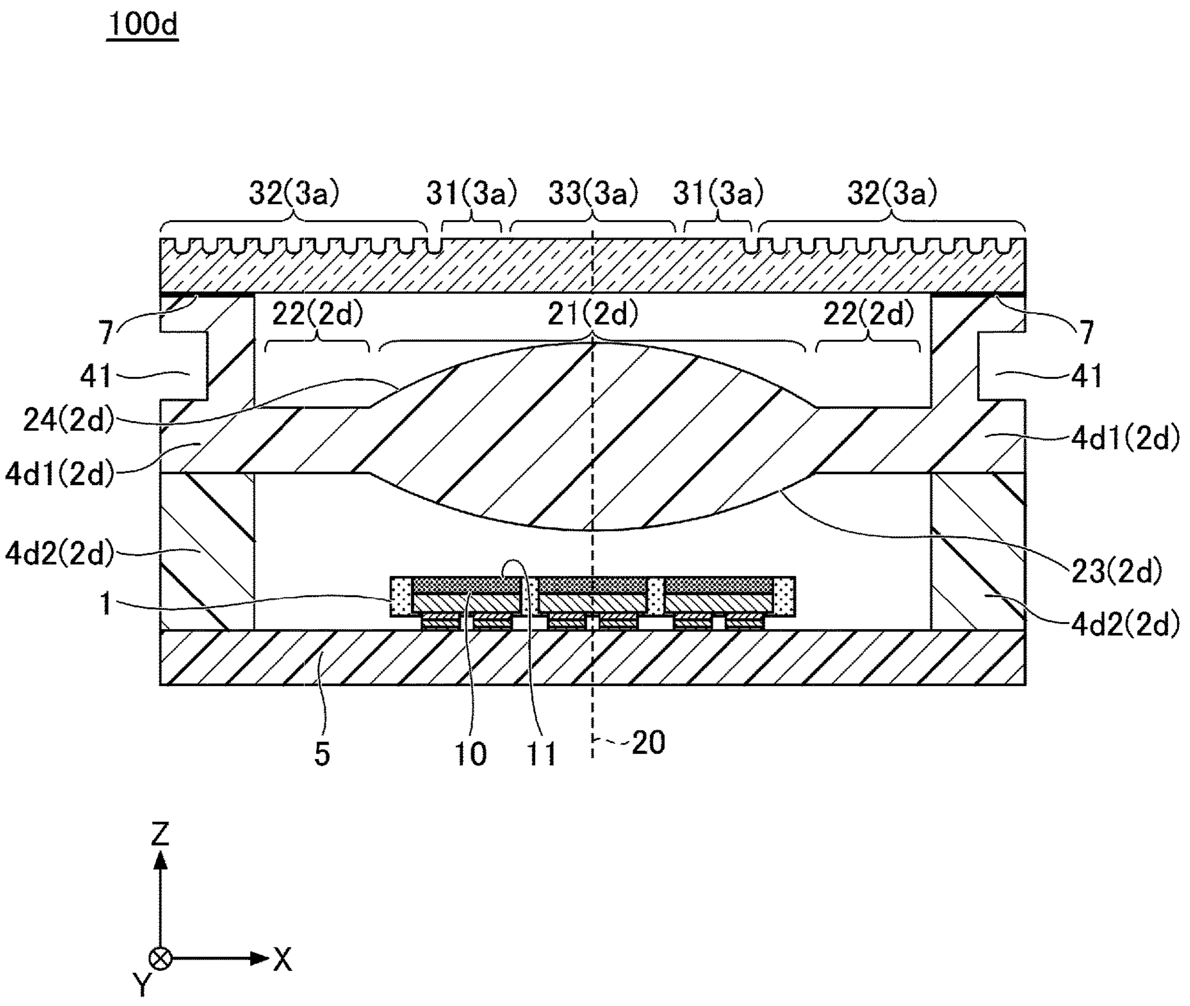
FIG. 12A schematic is a cross-sectional view illustrating a first example of a light emitting according to Modified Example 4.

FIG. 12A is a schematic cross-sectional view illustrating a first example of a light emitting module 100*d* according to Modified Example 4. A top view of the light emitting module 100*d* is substantially the same as FIG. 9. The schematic cross-sectional view in FIG. 12A illustrates a cross-section of the light emitting module 100*d* corresponding to the line X-X of FIG. 9. In the present modified example, the light emitting module 100*d* is different from the light emitting module 100*c* according to Modified Example 3 in including a lens 2*d* that includes a lens support portion 4*d*1 and a lens support portion 4*d*2 and defines a recess 41 on an outer lateral surface of the lens support portion 4*d*1. The recess 41 is formed in the shape of a groove that extends circumferentially in the lens support portion 4*d* along the circumferential direction.

In the light emitting module 100*d*, the lens support portion 4*d*1 is provided on the lens support portion 4*d*2, and the lens portion 22 is integrated with the lens support portion 4*d*1. For example, the effective portion 21, the lens portion 22, and the lens support portion 4*d*1 may be made of the same material. The light emitting module 100*d* can be provided to a smartphone by fitting a contact member for bringing the light emitting module 100*d* into close contact with the housing of the smartphone into the recess 41. The contact member is an annular member made of an elastic material such as natural rubber or synthetic rubber. When the light emitting module 100*d* is fixed to the housing of the smartphone in a state where the contact member is fitted to the recess 41, it is possible to reduce entry of dust, liquid, or the like into the inside of the smartphone from a gap between the light emitting module 100*d* and the housing of the smartphone due to a sealing effect of the contact member.

For example, when a recess is formed by the lower surface of the cover member and the outer lateral surface of the lens support portion, the contact area between the upper surface of the lens support portion and the lower surface of the cover member decreases. This structure may reduce the support strength of for the cover member by the lens support portion.

Figure 12B:
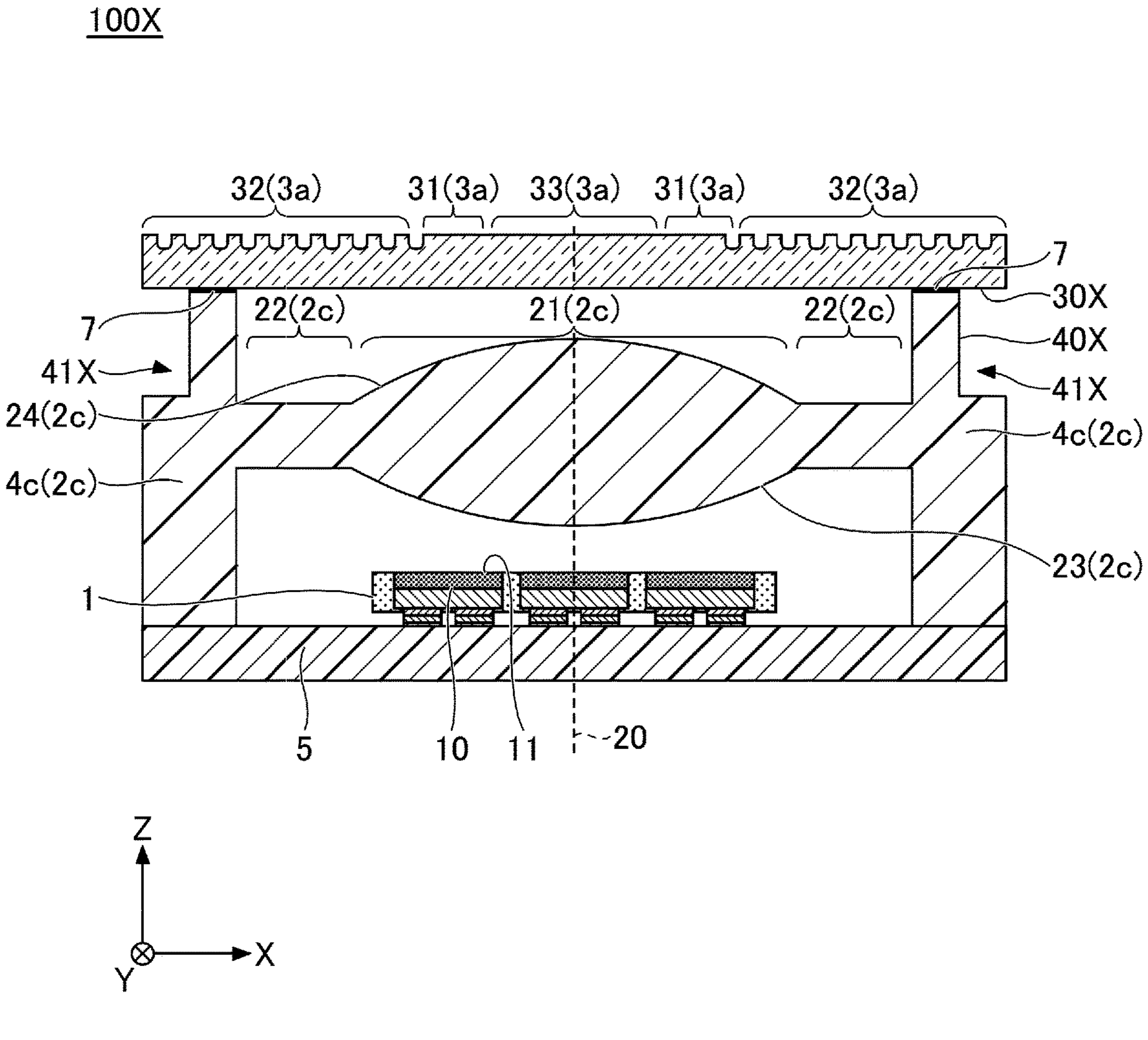
FIG. 12B is a schematic cross-sectional view illustrating an example of the light emitting module according to Reference Example.

A reduction in the support strength for the cover member by the lens support portion will be described in more detail with reference to FIG. 12B. FIG. 12B is a schematic cross-sectional view illustrating an example of a light emitting module 100X according to a reference example. A top view of the light emitting module 100X is substantially the same as FIG. 9. The schematic cross-sectional view in FIG. 12B illustrates a cross-section of the light emitting module 100X corresponding to the line X-X of FIG. 9. In order to facilitate comparison between the light emitting module 100X and the light emitting module 100*d*, in FIG. 12B, components having substantially the same functions as those of the light emitting module 100*c* are denoted by the same reference numerals as those of the light emitting module 100*c* in FIG. 11 for convenience.

In FIG. 12B, a recess 41X is a recess formed by a lower surface 30X of the cover member 3*a* and an outer lateral surface 40X of the lens support portion 4*c*. In the recess 41X, a thickness of the lens support portion 4*c* is reduced, that is, the length of the lens support portion 4*c* in the X direction is reduced. The contact area between the upper surface of the lens support portion 4*c* and the lower surface of the cover member 3*a* decreases as the length of the lens support portion 4*c* in the X direction becomes shorter, so that there is a possibility that the support strength for the cover member 3*a* by the lens support portion 4*c* decreases.

The light emitting module 100*d* according to the present modified example includes the groove-shaped recess 41 formed on the outer lateral surface of the lens support portion 4*d*1, so that the area of the upper surface of the lens support portion 4*d*1 is not reduced. Therefore, in the light emitting module 100*d*, it is possible to hold the contact member with high support strength for the cover member 3*a* by the lens support portion.

Effects other than those described above are the same as those of the above-described embodiment and modified examples.

Figure 12C:
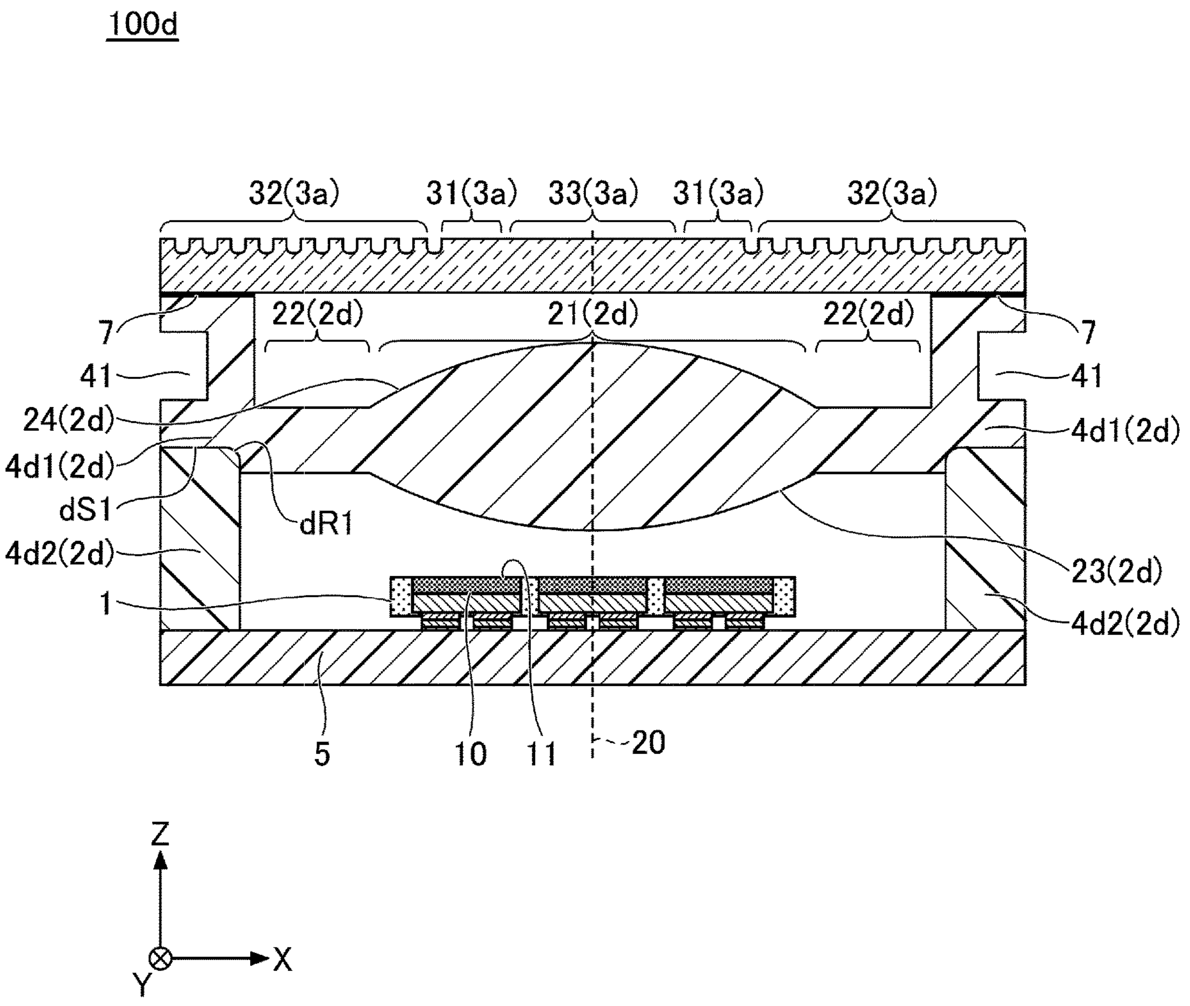
FIG. 12C is a schematic cross-sectional view illustrating a second example of the light emitting module according to Modified Example 4.

FIG. 12C is a schematic cross-sectional view illustrating a second example of the light emitting module 100*d* according to Modified Example 4. In FIG. 12C, the light emitting module 100*d* has at least one stepped portion dS1 on the lower surface of the lens support portion 4*d*1. In the present modified example, the stepped portion dS1 in which the thickness of the lens support portion 4*d*1 becomes thinner in the Z direction is annularly provided on the lower surface of the lens support portion 4*d*1 in a top view. The stepped portion dS1 may be provided on at least a part of the lower surface of the lens support portion 4*d*1, or may be provided on the entire lower surface of the lens support portion 4*d*1. A corner dR1 of the stepped portion may have a curvature. For example, the stepped portion dS1 may have a form in which the thickness of the lens support portion 4*d*1 becomes thicker in the z direction.

In addition, the light emitting module 100*d* may have at least one unevenness between the lens support portion 4*d*1 and the lens support portion 4*d*2. Surfaces of the lens support portion 4*d*1 and the lens support portion 4*d*2 facing each other may be rough surfaces.

With the configuration described above, in the second example of the light emitting module 100*d*, the contact area between the lens support portion 4*d*1 and the lens support portion 4*d*2 can be increased, and the bond strength between the lens support portion 4*d*1 and the lens support portion 4*d*2 can be improved. The other effects of this configuration are substantially the same as those of the first example of the light emitting module 100*d*.

Figure 12D:
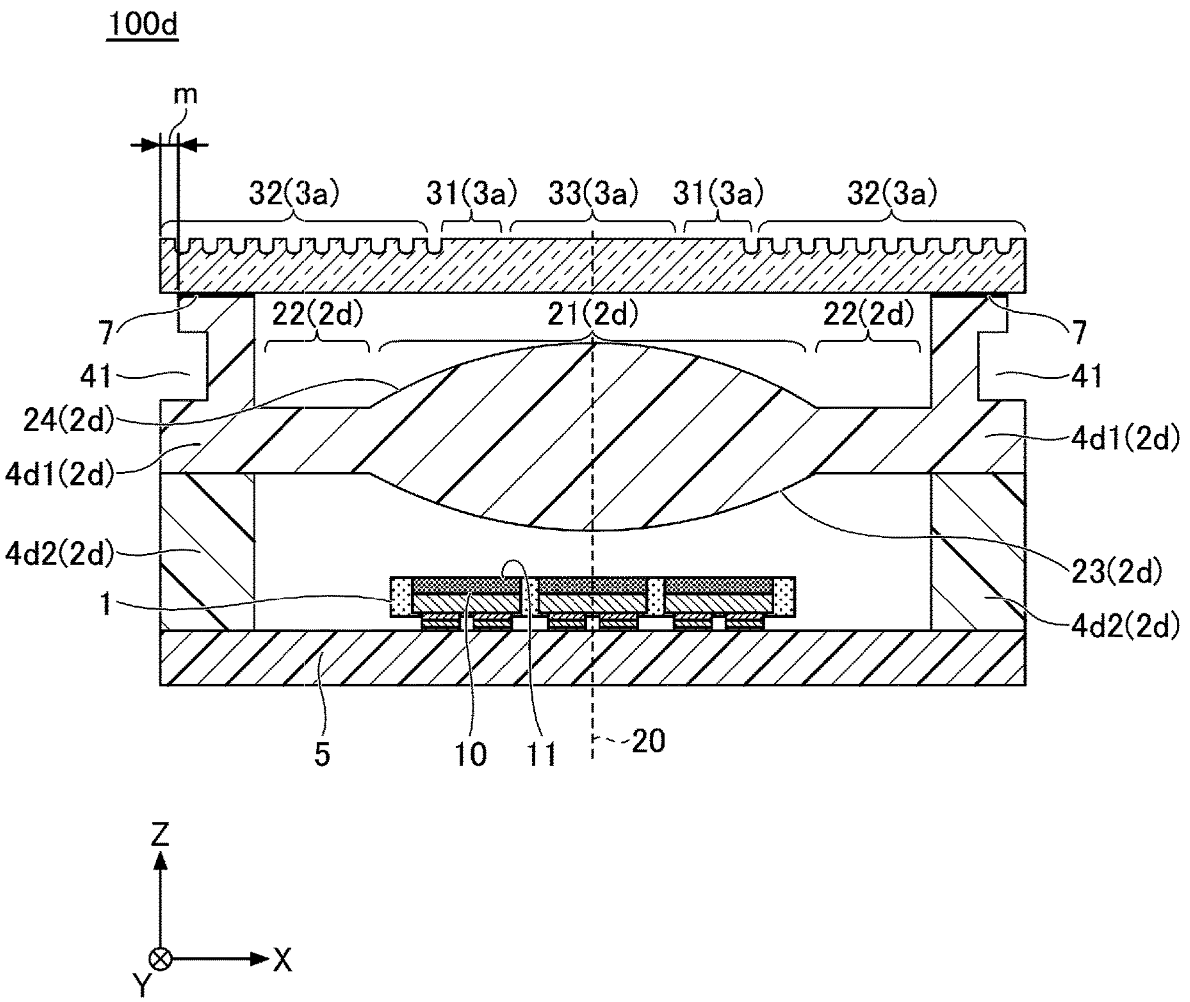
FIG. 12D is a schematic cross-sectional view illustrating a third example of the light emitting module according to Modified Example 4.

FIG. 12D is a schematic cross-sectional view illustrating a third example of the light emitting module 100*d* according to Modified Example 4. In FIG. 12D, the outer edge of the lens support portion 4*d*1 of the portion bonded to the cover member 3*a* is positioned inward of the outer edge of the cover member 3*a*. In a top view, a distance m between the outer edge of the cover member 3*a* and the outer edge of the portion of the lens support portion 4*d*1 bonded thereto is 10 μm or greater and 150 μm or less, and preferably 80 μm or greater and 120 μm or less. In the third example of the light emitting module 100*d*, this configuration allows for reducing climbing-up of the adhesive member 7 on the lateral surface of the cover member 3*a*. Thus, when the cover member 3*a* is disposed on the lens support portion 4*d*1 via an uncured adhesive member 7, it is possible, in a top view, to reduce the possibility that the uncured adhesive member 7 overruns to the outside of the outer edge of the cover member 3*a* to cure, which would thereby degrade the appearance of the light emitting module 100*d*, when viewed from the +Z side. In addition, if the adhesive member 7 overruns outward from the outer edge of the cover member 3*a*, for example, when the light emitting module is incorporated into a housing of a smartphone or the like, the light emitting module may not enter the opening of the housing. On the other hand, in the third example of the light emitting module 100*d*, this can be prevented. The other effects are substantially the same as those of the first example of the light emitting module 100*d*.

Modified Example 5

Figure 13:
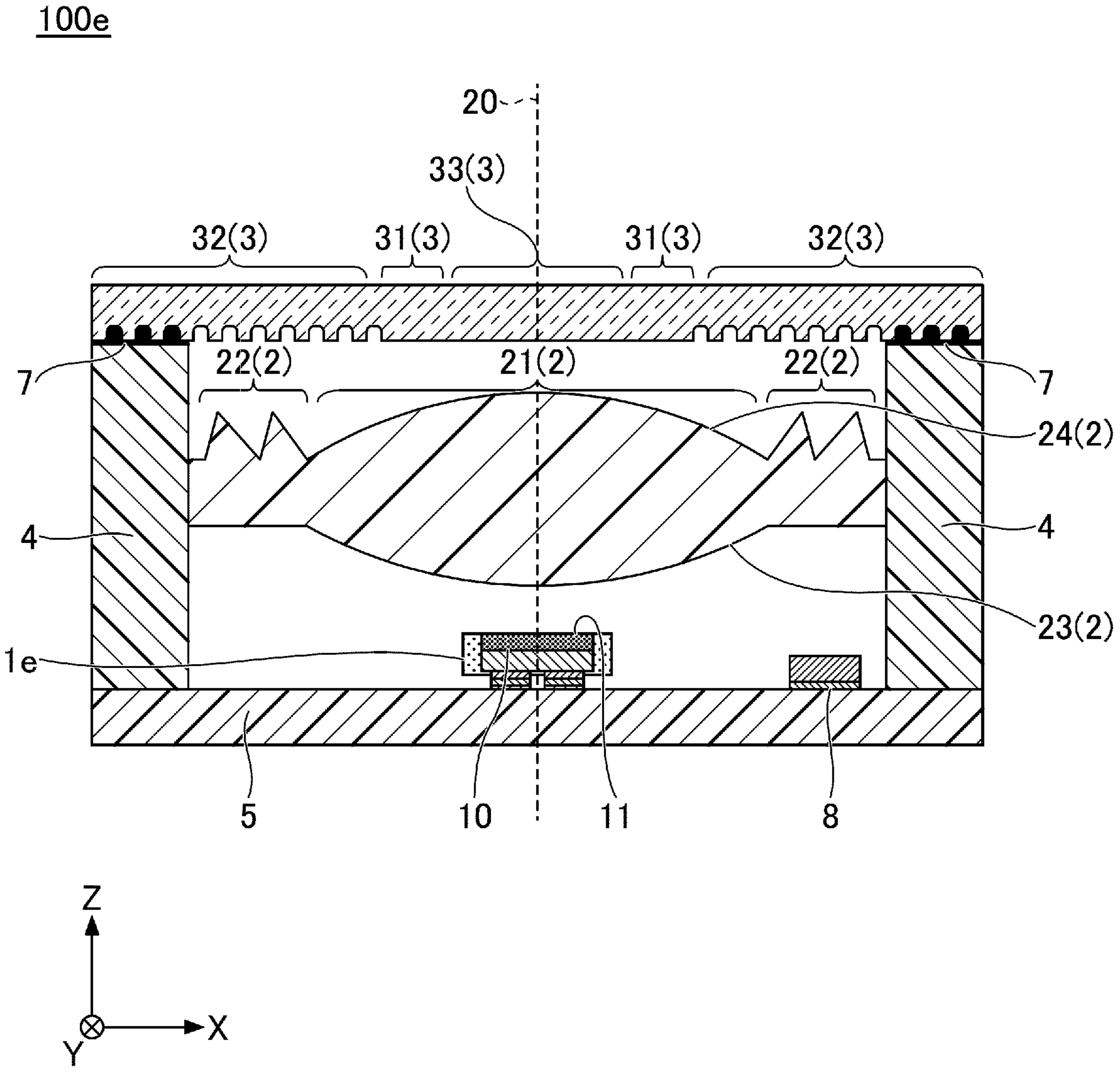
FIG. 13 is a schematic cross-sectional view illustrating an example of a light emitting module according to Modified Example 5.

FIG. 13 is a schematic cross-sectional view illustrating an example of a light emitting module 100*e* according to Modified Example 5. In the present modified example, the light emitting module 100*e* is different from the light emitting module 100 according to the embodiment in that a light source 1*e* including one light emitting part 10 instead of a plurality of the light emitting parts 10, and an electronic component 8 such as a drive circuit of the light source 1*e* are included. By providing the second region 32 to overlap with the lens portion 22 in the top view, the Fresnel shape of the lens portion 22, and the electronic component 8 and the like disposed on the first mounting substrate 5 excluding the light source 1*e*, are not appreciably visible from the outside of the light emitting module 100*e*. Thus, the appearance of the light emitting module 100 can be improved. Further, also in such a light emitting module 100*e*, it is possible to reduce stray light on an irradiation surface. An effect of irradiating a desired region with light can also be obtained.

Modified Example 6

Figure 14:
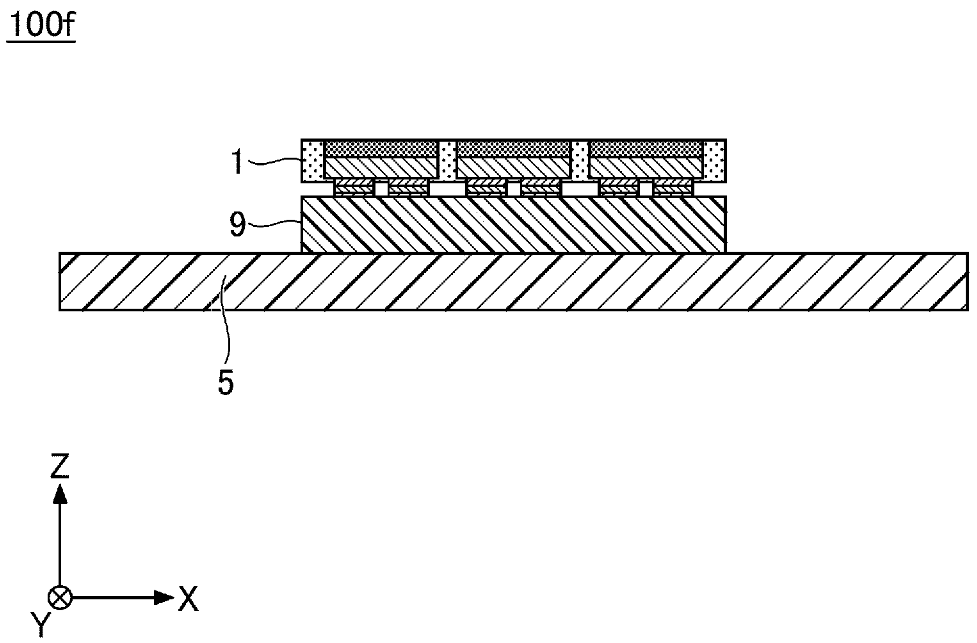
FIG. 14 is a schematic cross-sectional view illustrating the vicinity of a light source of a light emitting module according to Modified Example 6.

FIG. 14 is a schematic cross-sectional view illustrating the vicinity of the light source 1 of a light emitting module 100*f* according to Modified Example 6. In the present modified example, the light emitting module 100*f* is different from the light emitting module 100 according to the embodiment in including the light source 1 mounted on a second mounting substrate 9.

The second mounting substrate 9 is a substrate provided on the first mounting substrate 5. The second mounting substrate 9 includes silicon nitride, aluminum nitride, or the like. In the light emitting module 100*f*, including the second mounting substrate 9 allows for improving dissipation of heat generated from the light source 1 and the like.

Although certain embodiments have been described in detail above, the present disclosure is not limited to the above-described embodiments, and various modifications and substitutions can be added to the above-described embodiments without departing from the scope described in the claims.

The numbers such as ordinal numbers and quantities used in the description of the embodiments are all exemplified to specifically describe the technique of the present disclosure, and the present disclosure is not limited to the exemplified numbers. In addition, the connection relationship between the components is illustrated for specifically describing the technique of the present disclosure, and the connection relationship for realizing the function of the present disclosure is not limited thereto.

Since the light emitting module of the present disclosure can reduce stray light on an irradiation surface, the light emitting module can be suitably used for lighting, a camera flash, an in-vehicle headlight, and the like. However, the light emitting module of the present disclosure is not limited to these applications.

Aspects of the present disclosure are as follows, for example:

<1> A light emitting module includes a light source, a lens disposed over the light source and configured to transmit light from the light source, and a cover member disposed over the lens, wherein the cover member includes, in a top view, a first region, a second region located around the first region and having a higher light diffusion effect than the first region, and a third region located inward of the first region and on which the light from the light source transmitted through the lens is incident.

<2> The light emitting module according to above <1>, wherein the light source includes a light emitting region including at least one light emitting surface, wherein when f represents a focal length of the lens, d represents a shortest distance from a focal point of the lens to an upper surface of the cover member in a direction along an optical axis of the lens, and D represents a longest distance from a center of the light emitting region to an outer edge of the light emitting region in a direction along the light emitting surface, a maximum width W of the third region in a direction along the light emitting surface is expressed by a following formula:

$$W \geq 2 \times D \times d/f.$$

<3> The light emitting module according to above <1> or <2>, wherein at least one of the upper surface and the lower surface of the cover member in the second region is a rough surface.

<4> The light emitting module according to any one of above <1> to <3>, further including a lens support portion configured to support the lens, wherein the rough surface in the second region is provided on a lower surface of the cover member, and wherein the second region of the cover member is disposed on the lens support portion via an adhesive member.

<5> The light emitting module according to any one of above <1> to <4>, wherein, a diffusing substance is disposed on at least one of the upper surface and the lower surface of the cover member in the second region.

<6> The light emitting module according to any one of above <1> to <5>, wherein the diffusing substance is contained inside the cover member in the second region.

<7> The light emitting module according to any one of above <1> to <6>, wherein the lens includes a convex lens.

<8> The light emitting module according to above <7>, wherein the lens includes a lens portion having a light exit surface having a Fresnel shape, and the lens portion overlaps with the second region in a top view.

<9> The light emitting module according to any one of above <1> to <8>, further including a lens support portion configured to support the lens, wherein the lens support portion defines a recess on an outer lateral surface thereof.

<10> The light emitting module according to any one of above <1> to <9>, wherein the light source includes a plurality of light emitting parts, and light from each of the plurality of the light emitting parts having passed through the lens is irradiated to a region located on a side opposite to a position of the respective one of the plurality of the light emitting parts with respect to a point on the optical axis of the lens.

<11> The light emitting module according to any one of above <1> to <10>, wherein the light source includes at least one light emitting part, the light emitting part includes a light emitting element, a wavelength conversion member, and a light shielding member, and wherein each of a lateral surface of the light emitting element and a lateral surface of the wavelength conversion member is covered with the light shielding member.

<12> The light emitting module according to above <11>, wherein the light source includes a plurality of the light emitting parts, and wherein the light shielding member integrally holds a plurality of the light emitting elements and a plurality of the wavelength conversion members.

<13> A camera flash comprising the light emitting module according to any one of above <1> to <12>.

What is claimed is:

1. A light emitting module comprising:

a light source comprising a plurality of light emitting parts that are configured to be turned on individually or configured to be turned on in groups of multiple light emitting parts; and a cover member disposed over the light source and configured to transmit light from the light source, the cover having an upper surface that includes a flat surface portion; and wherein the cover member comprises, in a top view:

a first region, a second region located around the first region, wherein a light diffusion effect of the second region is higher than a light diffusion effect of the first region, and a third region located inward of the first region and on which the light from the light source is incident.

2. The light emitting module according to claim 1, further comprising:

a lens disposed between the light source and the cover member.

3. The light emitting module according to claim 2, wherein:

the light source comprises a light emitting region including at least one light emitting surface, and where f represents a focal length of the lens, d represents a shortest distance from a focal point of the lens to the upper surface of the cover member in a direction along an optical axis of the lens, and D represents a longest distance from a center of the light emitting region to an outer edge of the light emitting region in a direction along the light emitting surface, a maximum width W of the third region in a direction along the light emitting surface is expressed by a formula:

$$W \geq 2 \times D \times d/f.$$

4. The light emitting module according to claim 2, further comprising:

a lens support portion configured to support the lens; wherein:

a lower surface of the cover member includes a rough surface portion located in the second region; and the second region of the cover member is disposed on the lens support portion via an adhesive member.

5. The light emitting module according to claim 2, wherein:

the lens comprises a convex lens.

6. The light emitting module according to claim 5, wherein:

the lens comprises a lens portion that has a light exit surface having a Fresnel shape and that overlaps with the second region in a top view.

7. The light emitting module according to claim 2, further comprising:

a lens support portion configured to support the lens; wherein:

the lens support portion defines a recess at an outer lateral surface thereof.

8. The light emitting module according to claim 2, wherein:

light from each of the plurality of light emitting parts having passed through the lens is irradiated to a region located on a side opposite to a position of a respective one of the plurality of light emitting parts with respect to a point on an optical axis of the lens.

9. The light emitting module according to claim 2, wherein:

the lens comprises an effective portion and a lens portion located outside the effective portion;

the lens portion comprises a protrusion at a light emitting surface of the lens portion; and in a top view, the second region of the cover member overlaps the lens portion of the lens.

10. The light emitting module according to claim 1, wherein:

at least one of the upper surface or a lower surface of the cover member in the second region includes a rough surface portion.

11. The light emitting module according to claim 1, wherein:

a diffusing substance is disposed on at least one of the upper surface or a lower surface of the cover member in the second region.

12. The light emitting module according to claim 1, wherein:

a diffusing substance is contained inside the cover member in the second region.

13. The light emitting module according to claim 1, wherein:

at least one light emitting part of the plurality of light emitting parts comprises a light emitting element, a wavelength conversion member, and a light shielding member; and lateral surfaces of the light emitting element and lateral surfaces of the wavelength conversion member are covered with the light shielding member.

14. The light emitting module according to claim 13, wherein:

the light shielding member integrally holds the light emitting elements and the wavelength conversion members of the plurality of light emitting parts.

15. A camera flash comprising:

the light emitting module according to claim 1.

16. The light emitting module according to claim 1, wherein a light diffusion effect of the third region is less than the light diffusion effect of the second region.

17. The light emitting module according to claim 1, wherein:

the light source comprises a light emitting region including a center portion and an outer edge portion located outside the center portion; and the light source is configured to switch between a wide-angle mode, in which all of the plurality of light emitting parts emit light, and a narrow-angle mode, in which light emitting parts located at the center portion of the light emitting region emit light and light emitting parts located at the outer edge portion of the light emitting region do not emit light.

* * * * *